(12) United States Patent
Kim et al.

(10) Patent No.: US 10,454,552 B2
(45) Date of Patent: Oct. 22, 2019

(54) BEAMFORMING METHOD AND APPARATUS THEREFOR

(71) Applicant: Samsung Electronics Co., Ltd., Suwon-si (KR)

(72) Inventors: Jaewon Kim, Seoul (KR); Seokki Ahn, Suwon-si (KR); Namjeong Lee, Suwon-si (KR); Hyunkyu Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/543,965

(22) PCT Filed: Jan. 15, 2016

(86) PCT No.: PCT/KR2016/000469
§ 371 (c)(1),
(2) Date: Jul. 14, 2017

(87) PCT Pub. No.: WO2016/114631
PCT Pub. Date: Jul. 21, 2016

(65) Prior Publication Data
US 2018/0013477 A1 Jan. 11, 2018

(30) Foreign Application Priority Data
Jan. 16, 2015 (KR) .................. 10-2015-0008035

(51) Int. Cl.
*H04B 7/06* (2006.01)
*H04B 7/04* (2017.01)
*H04B 7/0413* (2017.01)

(52) U.S. Cl.
CPC ............ *H04B 7/0617* (2013.01); *H04B 7/04* (2013.01); *H04B 7/0413* (2013.01); *H04B 7/06* (2013.01)

(58) Field of Classification Search
CPC ............... H04B 7/06–0697; H04B 7/04–0413
See application file for complete search history.

(56) References Cited

U.S. PATENT DOCUMENTS

2007/0189416 A1    8/2007  Kim et al.
2009/0086695 A1*   4/2009  Gilb ................... H04N 21/4325
                                                370/338

(Continued)

FOREIGN PATENT DOCUMENTS

KR    1020140096489 A    8/2014
WO      2013/022260 A2   2/2013

OTHER PUBLICATIONS

International Search Report dated May 4, 2016 in connection with International Patent Application No. PCT/KR2016/000469.

(Continued)

*Primary Examiner* — Raymond S Dean

(57) ABSTRACT

The present disclosure relates to a 5G or pre-5G communication system for supporting a higher data transmission rate than a 4G communication system such as LTE. An embodiment of the present specification relates to an apparatus and a method for MIMO transmission and reception in a closed-loop beamforming system. A communication method of a base station, according to one embodiment of the present invention, may comprise the steps of: transmitting information for channel measurement to a terminal; receiving channel-related information from the terminal; transmitting a first symbol via at least two antennas; and transmitting a second symbol via the at least two antennas by applying different channel mapping rules to the second symbol in the at least two antennas. One embodiment of the present invention can improve overall performance without downward leveling by a symbol transmitted via an antenna having low average channel power.

14 Claims, 21 Drawing Sheets

(56) References Cited

U.S. PATENT DOCUMENTS

| | | | |
|---|---|---|---|
| 2009/0262855 A1* | 10/2009 | Lee | H04L 1/0009 |
| | | | 375/267 |
| 2010/0238913 A1* | 9/2010 | Xia | H04B 7/0626 |
| | | | 370/342 |
| 2010/0279621 A1 | 11/2010 | Brown et al. | |
| 2014/0072076 A1 | 3/2014 | Taherzadehboroujeni et al. | |
| 2014/0321296 A1* | 10/2014 | Balraj | H04L 5/0032 |
| | | | 370/252 |
| 2015/0289281 A1 | 10/2015 | Kim et al. | |

OTHER PUBLICATIONS

Written Opinion of the International Searching Authority dated May 4, 2016 in connection with International Patent Application No. PCT/KR2016/000469.

* cited by examiner (a)

(b)

(a)

(b)

(a)

(b)

BEAMFORMING METHOD AND APPARATUS THEREFOR

CROSS-REFERENCE TO RELATED APPLICATION(S)

The present application claims priority under 35 U.S.C. § 365 to International Patent Application No. PCT/KR2016/000469 filed Jan. 15, 2016, which claims priority to Korean Patent Application No. 10-2015-0008035 filed Jan. 16, 2015, each of which are incorporated herein by reference into the present disclosure as if fully set forth herein.

TECHNICAL FIELD

The present invention relates to a Multiple-Input Multiple-Output (MIMO) transmission/reception apparatus and method for use in a closed-loop beamforming system.

BACKGROUND ART

In order to meet the increasing demand for wireless data traffic since the commercialization of 4G communication systems, the development focus is on the $5^{th}$ Generation (5G) or pre-5G communication system. For this reason, the 5G or pre-5G communication system is called a beyond 4G network communication system or post Long-Term Evolution (LTE) system.

Consideration is being given to implementing the 5G communication system in millimeter wave (mmW) frequency bands (e.g., 60 GHz bands) to accomplish higher data rates. In order to increase the propagation distance by mitigating propagation loss in the 5G communication system, discussions are underway about various techniques such as beamforming, massive Multiple-Input Multiple Output (MIMO), Full Dimensional MIMO (FD-MIMO), array antenna, analog beamforming, and large scale antenna.

Also, in order to enhance network performance of the 5G communication system, developments are underway of various techniques such as evolved small cell, advanced small cell, cloud Radio Access Network (RAN), ultra-dense network, Device to Device (D2D) communication, wireless backhaul, moving network, cooperative communication, Coordinated Multi-Points (CoMP), and interference cancellation.

Furthermore, the 5G communication system adopts an Advanced Coding Modulation (ACM) scheme such as FQAM (i.e., combination of Frequency Shift Keying (FSK) and Quadrature Amplitude Modulation (QAM) and Sliding Window Superposition Coding (SWSC) and an enhanced network access scheme such as Filter Bank Multi Carrier (FBMC), Non-Orthogonal Multiple Access (NOMA), and Sparse Code Multiple Access (SCMA).

Mobile communication systems are evolving toward providing higher data rates to meet the ever growing wireless data traffic demand. For example, in order to meet the high data rate requirements of wireless communication systems, technical developments are focused on spectral efficiency enhancement and channel capacity expansion based on various communication technologies such as Orthogonal Frequency Division Multiplexing (OFDM) and Multiple Input Multiple Output (MIMO).

DISCLOSURE OF INVENTION

Technical Problem

The present invention aims to solve the downward standardization problem of overall throughput caused by symbols being transmitted through antennas with low average channel powers in a system adopting a Spatial Multiplexing (SM) scheme capable of transmitting different symbols through multiple antennas simultaneously.

Also, the present invention aims to solve the problem of an insufficient diversity effect caused by antennas with low average channel powers in a system adopting a MIMO diversity transmission scheme capable of transmitting copies of a symbol through multiple antennas simultaneously.

The objects of the present invention are not limited to the aforesaid, and other objects not described herein will be clearly understood by those skilled in the art from the descriptions below.

Solution to Problem

In accordance with an aspect of the present invention, a communication method of a base station includes transmitting channel measurement configuration information to a terminal, receiving channel information from the terminal, transmitting a first symbol through at least two antennas, and transmitting a second symbol to which different channel mapping rules are applied for the at least two antennas.

Preferably, receiving the channel information includes receiving information on the different mapping rules to be applied to the at least two antennas from the terminal.

Preferably, the method further includes determining the different mapping rules to be applied to the at least two antennas based on the channel information and transmitting the information on the determined channel mapping rules to the terminal.

Preferably, the first and second symbols are transmitted through two antennas according to an equation:

$$\begin{bmatrix} x_1 \\ x_2 \end{bmatrix} = \frac{1}{\sqrt{2}} \begin{bmatrix} s_1 + e^{j\theta_1} s_2 \\ s_1 - s_2 \end{bmatrix},$$

where x1 denotes a first transmit signal transmitted through a first antenna of the two antennas, x2 denotes a second transmit signal transmitted through a second antenna of the two antennas, s1 and s2 denote the first and second symbols, and θ1 denotes a phase rotation to be applied to the second symbol for transmission through the first antenna.

Preferably, the first and second symbols are transmitted through two antennas according to an equation:

$$\begin{bmatrix} x_1 \\ x_2 \end{bmatrix} = \frac{1}{\sqrt{2}} \begin{bmatrix} s_1 + e^{j\theta_1} s_2 \\ s_1 + e^{j\theta_2} s_2 \end{bmatrix},$$

where x1 denotes a first transmit signal transmitted through a first antenna of the two antennas, x2 denotes a second transmit signal transmitted through a second antenna of the two antennas, s1 and s2 denote the first and second symbols, and θ1 denotes a phase rotation to be applied to the second symbol for transmission through the first antenna, and θ2 denotes a phase rotation to be applied to the second symbol for transmission through the second antenna.

Preferably, the first and second symbols are transmitted through two antennas according to an equation:

$$\begin{bmatrix} x_1 \\ x_2 \end{bmatrix} = \frac{1}{\sqrt{2}} \begin{bmatrix} s_1 + a_1 s_2 \\ s_1 - a_2 s_2 \end{bmatrix},$$

where x1 denotes a first transmit signal transmitted through a first antenna of the two antennas, x2 denotes a second transmit signal transmitted through a second antenna of the two antennas, s1 and s2 denote the first and second symbols, a1 denotes a channel mapping rule value to be applied to the second symbol transmitted through the first antenna, and a2 denotes a channel mapping rule value to be applied to the second symbol transmitted through the second antenna.

In accordance with another aspect of the present invention, a communication method of a terminal includes receiving channel measurement configuration information from a base station, measuring channels, transmitting channel information to the base station, receiving a first symbol through at least two antennas, and receiving a second symbol to which different channel mapping rules are applied for the at least two antennas.

Preferably, transmitting the channel information includes determining channel mapping rules to be applied for the at least two antennas based on a channel measurement result and transmitting information on the channel mapping rules to the base station.

Preferably, the method further includes receiving information on the channel mapping rules to be applied to the at least two antennas from the base station.

In accordance with another aspect of the present invention, a base station includes a communication unit which transmits and receives signals, and a controller which controls transmitting channel measurement configuration information to a terminal, receiving channel information from the terminal, transmitting a first symbol through at least two antennas, and transmitting a second symbol to which different channel mapping rules are applied for the at least two antennas.

Preferably, the controller controls transmitting channel measurement configuration information to a terminal, receiving channel information from the terminal, transmitting at least one symbol mapped to a first constellation point through a first antenna, and transmitting the at least one symbol mapped to a second constellation point through a second antenna.

In accordance with another aspect of the present invention, a terminal includes a communication unit which transmits and receives signals and a controller which controls receiving channel measurement configuration information from a base station, measuring channels, transmitting channel information to the base station, receiving a first symbol through at least two antennas, and receiving a second symbol to which different channel mapping rules are applied for the at least two antennas.

Preferably, the controller controls receiving channel measurement configuration information from a base station, measuring channels, transmitting channel information to the base station, receiving at least one symbol mapped to a first constellation point through a first antenna, and receiving the at least one symbol mapped to a second constellation point through a second antenna.

In accordance with an aspect of the present invention, a communication method of a base station includes transmitting channel measurement configuration information to a terminal, receiving channel information from the terminal, transmitting at least one symbol mapped to a first constellation point through a first antenna, and transmitting the at least one symbol mapped to a second constellation point through a second antenna.

Preferably, the second constellation point is included in a region in which at least one symbol of a region of the first constellation point is included.

In accordance with still another aspect of the present invention, a communication method of a terminal includes receiving channel measurement configuration information from a base station, measuring channels, transmitting channel information to the base station, receiving at least one symbol mapped to a first constellation point through a first antenna, and receiving the at least one symbol mapped to a second constellation point through a second antenna.

Advantageous Effects

The present invention is advantageous in terms of improving the overall throughput by protecting against downward standardization caused by symbols transmitted through antennas with a low average channel power in a system adopting a Spatial Multiplexing (SM) scheme capable of transmitting different symbols through multiple antennas simultaneously.

Also, the present invention is advantageous in terms of achieving a sufficient diversity effect with antennas with a low average channel power in a system adopting a MIMO diversity transmission scheme capable of transmitting copies of a symbol through multiple antennas simultaneously.

The advantages of the present invention are not limited to the aforesaid, and other advantages not described herein may be clearly understood by those skilled in the art from the descriptions below.

The other effects may be explicitly or implicitly disclosed in the description of the embodiments of the present invention.

MODE FOR THE INVENTION

Figure 1:
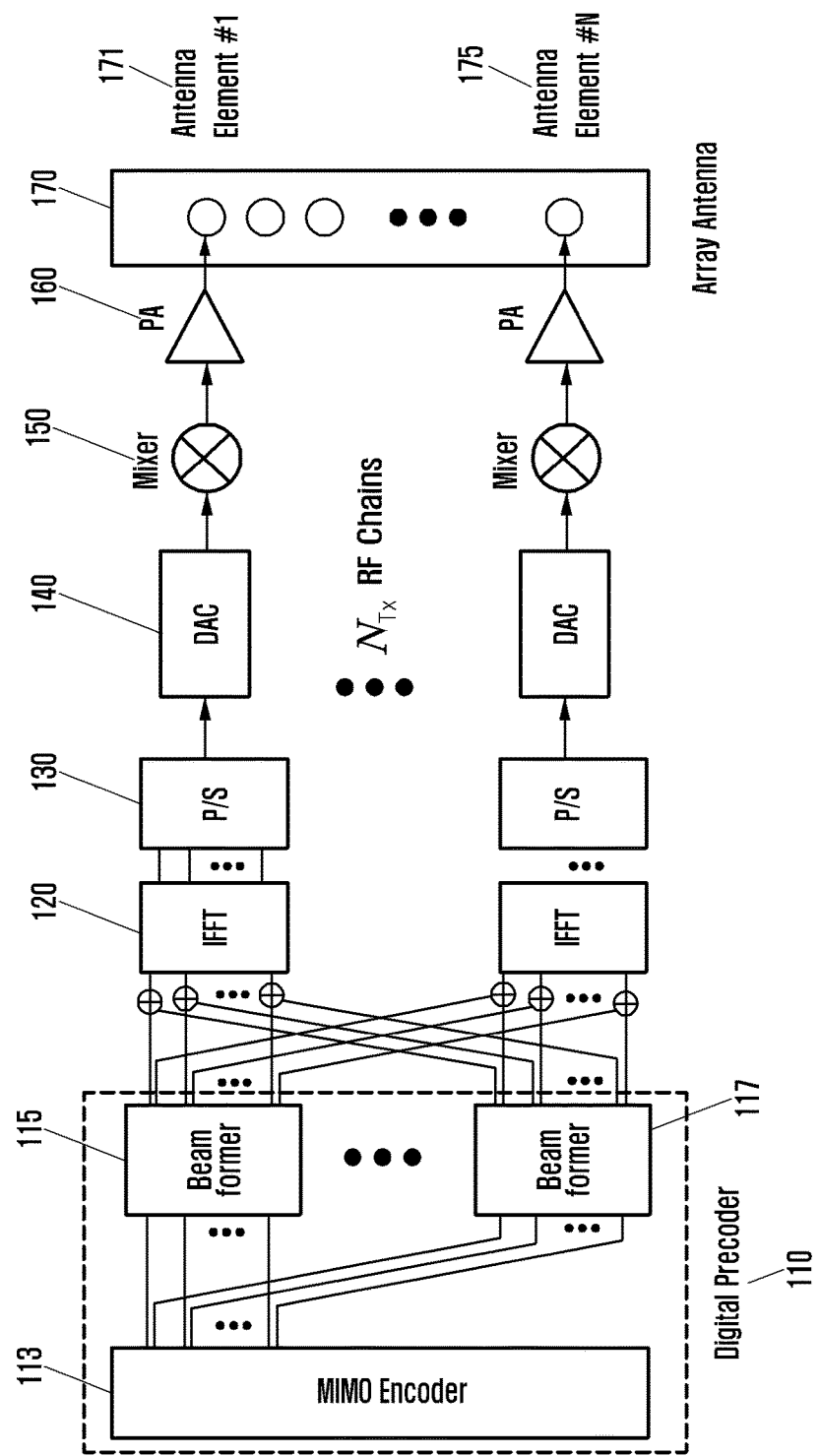
FIG. 1 is a diagram illustrating a configuration of a transmitter according to an embodiment of the present invention.

Exemplary embodiments of the present invention are described in detail with reference to the accompanying drawings.

Detailed descriptions of well-known functions and structures incorporated herein may be omitted to avoid obscuring the subject matter of the present invention. This aims to omit unnecessary description so as to make the subject matter of the present invention clear. Further, the following terms are defined in consideration of the functionality in the present invention, and they may vary according to the intention of a user or an operator, usage, etc. Therefore, the definition should be made on the basis of the overall content of the present specification.

For the same reason, some elements are exaggerated, omitted, or simplified in the drawings and, in practice, the elements may have sizes and/or shapes different from those shown in the drawings. The same reference numbers are used throughout the drawings to refer to the same or like parts.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions which are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce manufactured articles embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions which are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

According to various embodiments of the present disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

In the following description, well known structures and functions are not described in elaborate detail in order to avoid obscuring the subject matter of the present invention.

Although the description is mainly directed to the $3^{rd}$ Generation Partnership Project (3GPP) LTE system, it will be understood by those skilled in the art that the present invention can be applied even to other communication/computing systems having the similar technical background and channel format, with a slight modification, without departing from the spirit and scope of the present invention.

For example, the present invention directed to the LTE system is applicable to a UTRAN/GERAN system. In this case, an eNB (RAN node) may be replaced by an RNC/BSC, an S-GW may be omitted or included in a SGSN, and a P-GW may be replaced by a GGSN. The concept of bearer in LTE may correspond to that of PDP context in UTRAN/GERAN.

The embodiments of the present invention direct to the MIMO transmission schemes in a beamforming system. Although the description is directed to an exemplary beamforming system operating in an mmW frequency band, it is obvious that the present invention is applicable to legacy beamforming systems regardless of their frequency bands.

FIG. 1 is a diagram illustrating a configuration of a transmitter according to an embodiment of the present invention.

FIG. 1 exemplifies implementation of beamforming in an OFDM system. In FIG. 1, the transmitter may be comprised of a digital precoder 110 including a MIMO encoder 113 and beamformers 115 and 117, Inverse Fast Fourier Transforms (IFFTs) 120, Parallel-to-Serial (P/S) converters 130, Digital to Analog Converters (DACs) 140, mixers 150, Power Amplifiers (PAs) 160, and an Array Antenna 170. The array antenna 170 may include at least one antenna element as denoted by reference numbers 171 and 175. That is, the array antenna 170 is comprised of $N_{Tx}$ antenna elements including antenna element #1 171 to antenna element #N 175. Detailed descriptions of the individual components of the transmitter are omitted herein.

Meanwhile, the digital precoder 110 may be configured to perform MIMO encoding and beamforming simultaneously through digital processing. That is, the digital precoder 110 includes the MIMO encoder 113 and the beamformers 115 and 117 for performing the MIMO encoding and beamforming operations simultaneously in a digital phase. The beamforming is performed in units of Resource Block (RB), one RB consisting of $N_{tone}$ subcarriers in the frequency domain. That is, assuming that $N_{subcarriers}$ is the total number of subcarriers available in the system, it may be possible to form multiple beams in different directions with the $N_{RB}$ ($=N_{subcarriers}/N_{tone}$) frequency domain resources. Such beamforming may be accomplished by applying different beamforming weights to the respective antenna elements, the per-antenna element beamforming weights being expressed as complex numbers with different phases and absolute values.

Meanwhile, it may be possible to form two or more beams different in direction within one RB using several beamformers 115 and 117 as shown in FIG. 1. In this case, a channel between an $i^{th}$ receive (Rx) antenna and $j^{th}$ transmit (Tx) antenna may be expressed as $c_{ij}$. Here, the effective MIMO channels obtained by applying M beamform vectors $w_m = [w_1, \ldots, w_{Ntx}]^T$ with different directivities are expressed in a matrix $h_{im}$ of Equation (1).

$$\begin{bmatrix} h_{11} & \ldots & h_{1,M} \\ \vdots & \ddots & \vdots \\ h_{Nrx,1} & \ldots & h_{Nrx,M} \end{bmatrix} = \begin{bmatrix} C_{11} & \ldots & C_{1,Ntx} \\ \vdots & \ddots & \vdots \\ C_{Nrx,1} & \ldots & C_{Nrx,Ntx} \end{bmatrix} \begin{bmatrix} W_{11} & \ldots & W_{M,1} \\ \vdots & \ddots & \vdots \\ W_{1,Ntx} & \ldots & W_{M,Ntx} \end{bmatrix} \quad (1)$$

Here, $i=1, \ldots, N_{rx}$ and $m=1, \ldots, M$ are fulfilled. $N_{tx}$ denotes the number of antenna elements of the Tx antenna and $N_{rx}$ denotes the number of antenna elements of the Rx antenna. Hereinafter, the following description is directed to a case of forming one or more beams different in direction and, unless otherwise stated, the term "channel" is used in the meaning of the effective channels $h_{im}$ obtained through beamforming.

Figure 2:
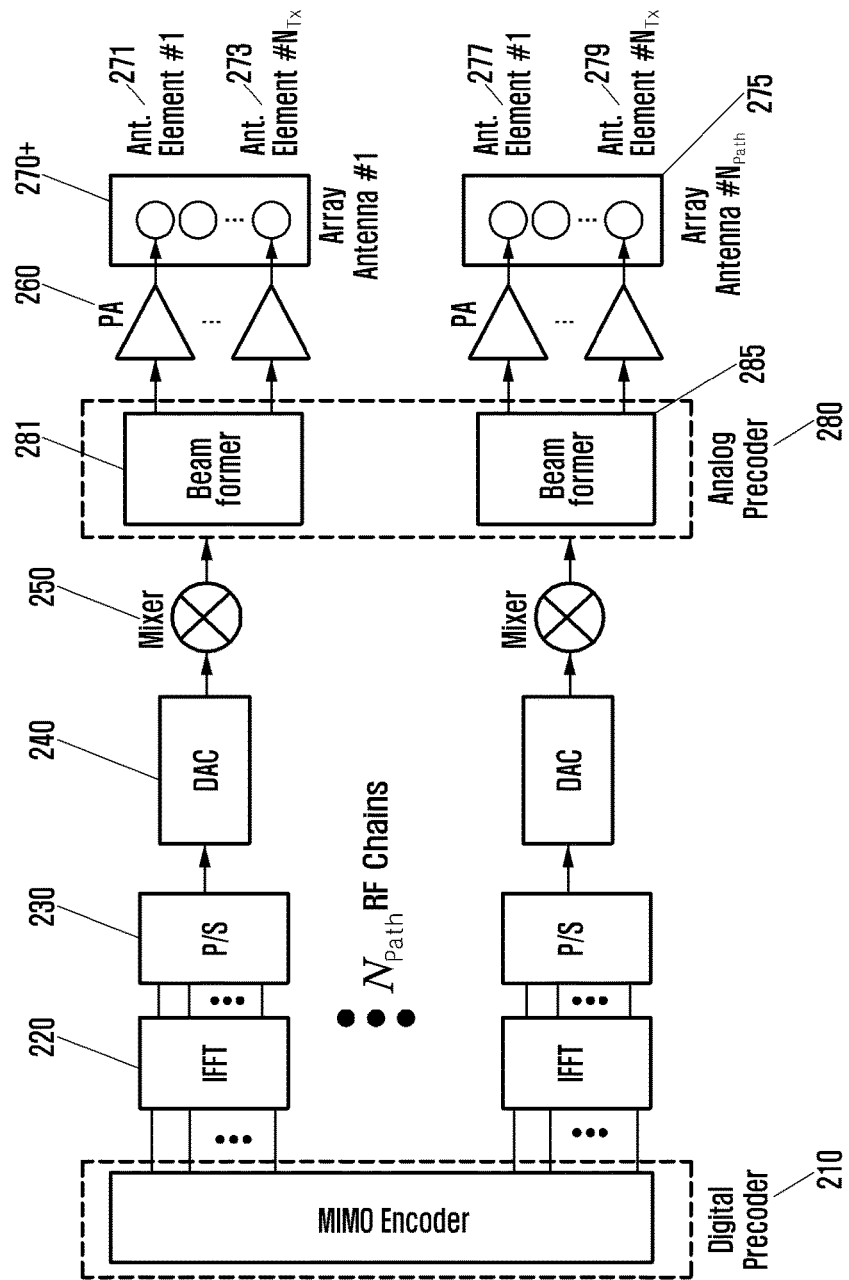
FIG. 2 is a diagram illustrating a configuration of a transmitter according to another embodiment of the present invention.

FIG. 2 is a diagram illustrating a configuration of a transmitter according to another embodiment of the present invention.

In reference to FIG. 2, the transmitter may be comprised of a MIMO encoder 210, IFFTs 220, P/Ss 230, DACs 240, mixers 250, an analog precoder 280 including beamformers 281, 285, PAs 260, and array antennas 270 to 275. The transmitter may include $N_{path}$ array antennas 270 to 275 corresponding to $N_{path}$ RF chains. Each of the array antennas 270 to 275 may include at least one antenna element as denoted by reference numbers 271, 273, 277, and 279. Each of the array antennas 270 and 275 may include $N_{Tx}$ antenna elements 271, 273, 277, and 279. Detailed descriptions of the individual components of the transmitter are omitted herein.

Even in this case where analog beamforming is performed with the beamformers 281 and 285 of the analog precoder 280, the description of the effective channel $h_{im}$ which was made with reference to FIG. 1 is applicable. In the embodiment of FIG. 2, however, Equation (1) expresses the effective channels formed through one of the array antennas 270 and 275 and, in this case, M=1. In the case where a base station is provided with $N_{path}$ array antennas as shown in FIG. 2, it may be possible to form $N_{path}$ beams different in direction simultaneously. A description is made of the exemplary case of applying the present invention to an analog domain Tx and Rx beamforming system. However, the present invention is also applicable to digital domain Tx and Rx beamforming systems. That is, the present invention is applicable to the digital domain beamforming that uses per-antenna precoding weight vectors before FFT in the OFDM system. Here, the antenna index, which is assigned per array antenna in the analog domain beamforming, may be assigned per precoding weight vector in the digital domain beamforming, the precoding weight vector being equivalent to antenna port in LTE.

Figure 3:
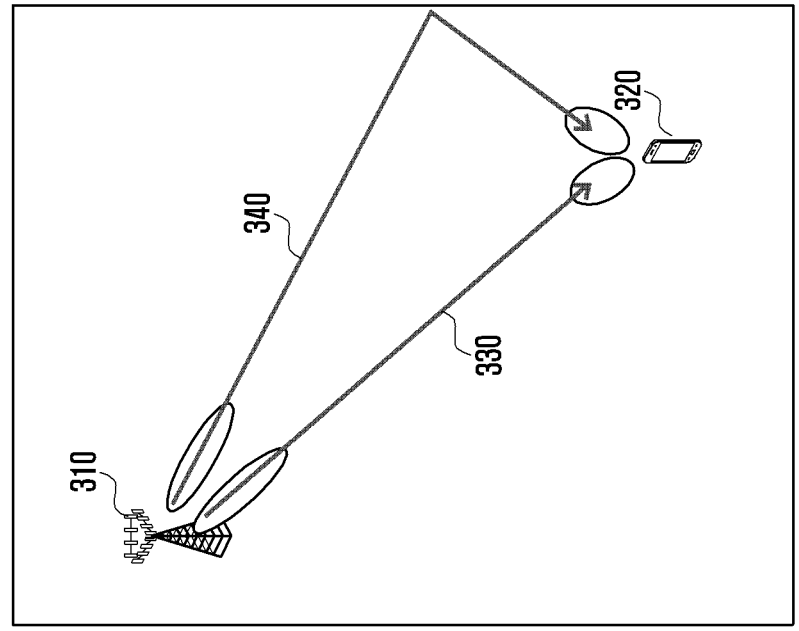
FIG. 3 is a diagram illustrating an exemplary method of allocating an analog beam to a terminal in an mmW beamforming system.
Figure 3:
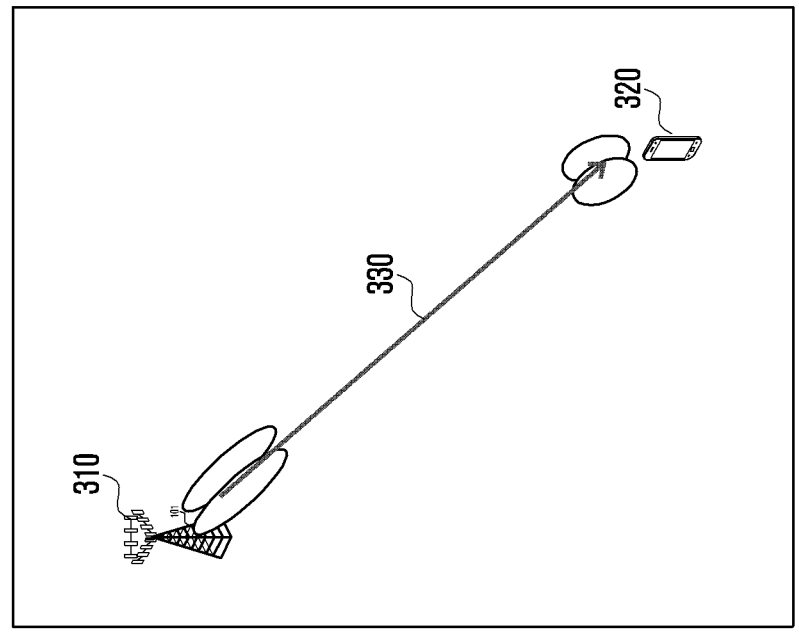

FIG. 3 is a diagram illustrating an exemplary method of allocating an analog beam to a terminal in an mmW beamforming system.

In reference to part (a) of FIG. 3, a base station (evolved Node B: eNB) 310 may configure 2 Tx beams to a terminal (User Equipment: UE) 320 over a Line-of-Sight (LoS) link 330. The UE 320 may configure an Rx beam over the LoS link to receive the Tx beams transmitted by the eNB 310 at a high-quality level.

In this case, however, the 2×2 MIMO channel matrix between Tx and Rx nodes may not be appropriate for Spatial Multiplexing (SM) for transmitting two different symbols simultaneously because of the characteristics of the signal components being received over the LoS link. That is, the high correlation between two links may cause a rank deficient situation. This may make it impossible to transmit signals in the SM mode.

In reference to part (b) of FIG. 3, the eNB 310 may configure a Tx beam over the LoS link 330 and another Tx beam over a Non-LoS (NLoS) link 340. Then, the UE 320 may also configure an Rx beam over the LoS link and another Rx beam over the NLoS link. In this case, the independent characteristics of the two links make it possible to establish the channels with full rank. Accordingly, it is possible to transmit a signal in the SM mode.

In this case, the 2×2 MIMO channel matrix may be expressed as Equation (1).

$$\begin{bmatrix} H_{LoS} & h_{12} \\ h_{21} & H_{NLoS} \end{bmatrix} \quad (2)$$

Here, $H_{LoS}$ denotes a channel component of the eNB's Tx beam and UE's Rx beam established over the LoS link, $H_{NLoS}$ denotes a channel component of the eNB's Tx beam and UE's Rx beam established over the NLoS link, and $h_{12}$ and $h_{21}$ denote channel components of the eNB's Tx beam and UE's Rx beams formed in different directions. Typically, there is a relationship of $|H_{LoS}|^2 > |H_{NLoS}|^2 \gg |h_{ij}|^2$, and the detailed values may vary depending on the analog beam width and number of beam patterns. Suppose that the beam gain attenuation of the eNB is 20 dB, the beam gain attenuation of the UE is 15 dB, and the beam gain difference between the LoS and NLoS links is 10 dB. In this case, the beam gain difference between the LoS and NLoS links may be caused by wall reflection loss and propagation loss. Assuming that the $H_{LoS}$ is 0 dBm, the $H_{NLoS}$ may be −10 dBm, and $h_{12}$ and $h_{21}$ may be −20 dBm and −15 dBm, respectively.

In the case of applying the well-known BLAST-based SM transmission scheme to the mmW beamforming system, the signals y1 and y2 received by two UE antennas may be expressed as Equation (3).

$$\begin{bmatrix} y_1 \\ y_2 \end{bmatrix} = \begin{bmatrix} H_{LoS} & h_{12} \\ h_{21} & H_{NLoS} \end{bmatrix} \begin{bmatrix} s_1 \\ s_2 \end{bmatrix} + \begin{bmatrix} n_1 \\ n_2 \end{bmatrix} \quad (3)$$

Here, $s_1$ and $s_2$ denote two different symbols transmitted by two Tx antennas of the eNB 310, and $n_1$ and $n_2$ denote noise and interference signals received by two Rx antennas of the UE 320.

By taking notice of the received signal quality difference between the LoS link and NLoS link, the UE may receive the symbol $s_1$ including a HLoS component with a high gain and the symbol $s_2$ including a HNLoS component with a relatively low gain as shown as Equation (3). In the SM scheme characterized in that a plurality of different symbols are transmitted simultaneously by multiple antennas, the system throughput may be degraded due to the downward standardization caused by the symbols transmitted by the antenna at a low average channel power. That is, if two symbols are generated by one modulator at the same Modulation and Coding Scheme (MCS) level, most errors are detected in symbol $s_1$ and, in this case, it is necessary to decrease the MCS level to the extent for the HNLoS channel gain, resulting in reduction of the entire transmission efficiency. Accordingly, if two symbols have the same codeword, the FER performance is determined by the low-quality channel. As a consequence, it may occur that the data rate on the LoS link is restricted by the accuracy limit of the RF device despite a sufficiently high Signal to Noise Ratio (SNR). Although the description is directed to the exemplary case where two symbols have the same codeword or are transmitted at the same MCS level, the present invention is not limited thereto.

Figure 4:
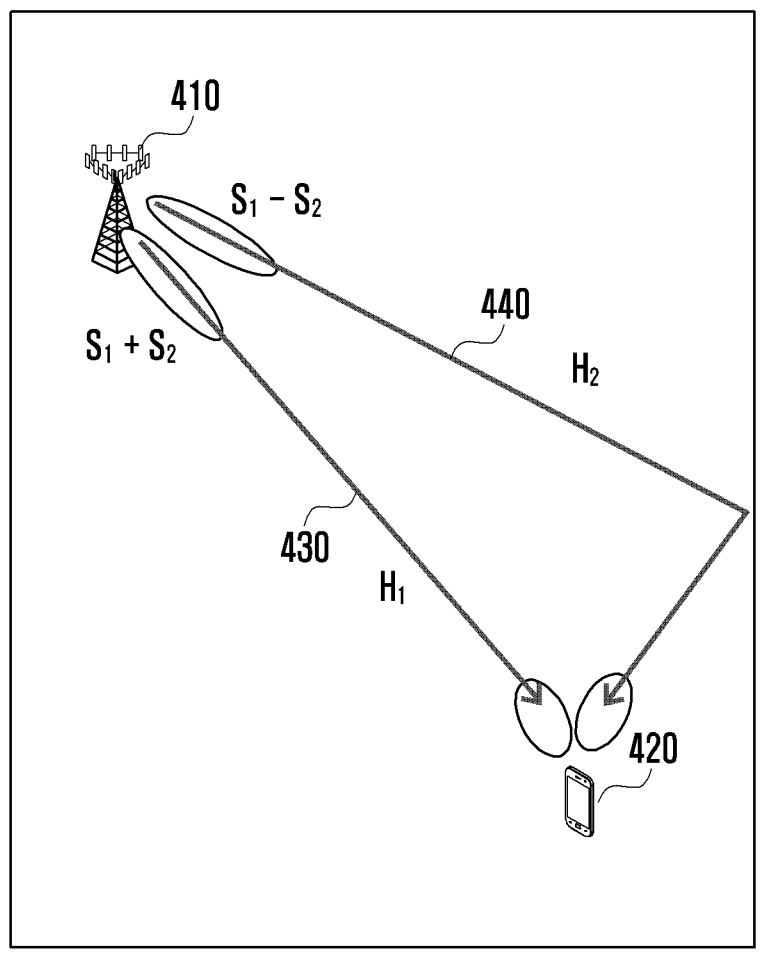
FIG. 4 is a diagram illustrating a method for establishing effective channels according to an analog beam allocation scheme for a UE in an mmW beamforming system.
Figure 5:
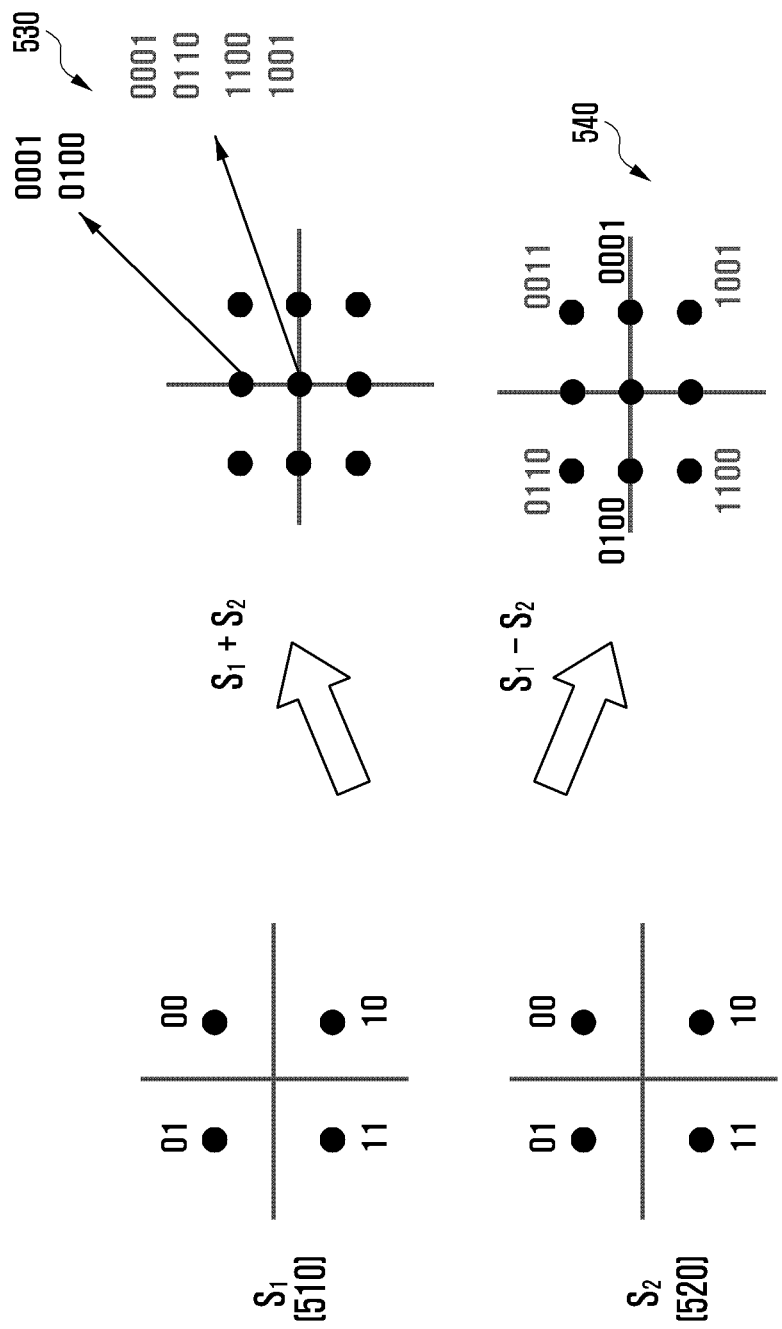
FIG. 5 is a diagram illustrating exemplary constellations of symbols for explaining the method.

FIG. 4 is a diagram illustrating a method for establishing effective channels according to an analog beam allocation scheme for a UE in an mmW beamforming system, and FIG. 5 is a diagram illustrating exemplary constellations of symbols for explaining the method.

In reference to FIG. 4, it may be possible to consider a method for establishing effective channels using a Discrete-time Fourier Transform (DFT) codebook to solve the above problem.

The signals $y_1$ and $y_2$ received by two antennas of the UE 420 may be expressed as Equation (4).

$$\begin{bmatrix} y_1 \\ y_2 \end{bmatrix} = \begin{bmatrix} H_1 & h_2 \\ h_1 & H_2 \end{bmatrix} \begin{bmatrix} 1/\sqrt{2} & 1/\sqrt{2} \\ 1/\sqrt{2} & -1/\sqrt{2} \end{bmatrix} \begin{bmatrix} s_1 \\ s_2 \end{bmatrix} + \begin{bmatrix} n_1 \\ n_2 \end{bmatrix} = \quad (4)$$

$$\frac{1}{\sqrt{2}} \begin{bmatrix} H_1 + h_2 & H_1 - h_2 \\ h_1 + H_2 & h_1 - H_2 \end{bmatrix} \begin{bmatrix} s_1 \\ s_2 \end{bmatrix} + \begin{bmatrix} n_1 \\ n_2 \end{bmatrix}$$

Here, $H_1$ denotes a channel component between the eNB's Tx beam and the UE's Rx beam formed over the LoS link 430, $H_2$ denotes a channel component between the eNB's Tx beam and the UE's Rx beam formed over the NLoS link 440, $h_2$ and $h_1$ denote channel components between the eNB's Tx beam and the UE's Rx beam formed in different directions, $s_1$ and $s_2$ denote two different symbols transmitted by two Tx antennas of the eNB 410, and $n_1$ and $n_2$ denote noise and interference signals received by two Rx antennas of the UE 420.

Also, $$\begin{bmatrix} 1/\sqrt{2} & 1/\sqrt{2} \\ 1/\sqrt{2} & -1/\sqrt{2} \end{bmatrix}$$

denotes a DFT matrix and, in this case, the effective channels may be expressed by $$\frac{1}{\sqrt{2}} \begin{bmatrix} H_1 + h_2 & H_1 - h_2 \\ h_1 + H_2 & h_1 - H_2 \end{bmatrix}$$

as shown in Equation (4). In this case, it may be possible to expect an effect in which the UE receives two symbols through the links with the same quality. However, this may have a problem in that the two links have the same information amount. That is, a combination of channels that shows ambiguity may cause decoding performance degradation.

In reference to FIG. 5, if the two symbols s1 510 and s2 520 are QPSK symbols, there can be 16 possible combinations. However, in the case of mapping the combinations in a real constellation diagram, they may be expressed by at most 9 constellation points as shown in FIG. 5. This means that the 16 possible combinations are mapped to 9 constellation points and thus ambiguity occurs for 7 combinations. For example, in the case of the beam formed over the LoS link 430 for transmitting the $s_1+s_2$ symbol, the symbol combinations 0001 and 0100, among all possible combinations of the two symbols s1 510 and s2 520, may be mapped to one point on the constellation diagram and the symbol combinations 0011, 0110, 1100, and 1001 may be mapped to another one point on the constellation diagram as denoted by reference number 530. Meanwhile, in the case of the beam formed over the NLoS link 440 for transmitting the $s_1-s_2$ symbol, the symbol combinations 0001, 0100 0011, 0110, 1100, and 1001, among all possible symbol combinations of the two symbols s1 510 and s2 520, may be mapped to different points on the constellation diagram as denoted by reference number 540. However, if an error occurs in detecting the $s_1-s_2$ symbol at the second antenna of the UE that is designated for forming an analog beam over the NLoS link 440, it is impossible to overcome the ambiguity problem.

Figure 6:
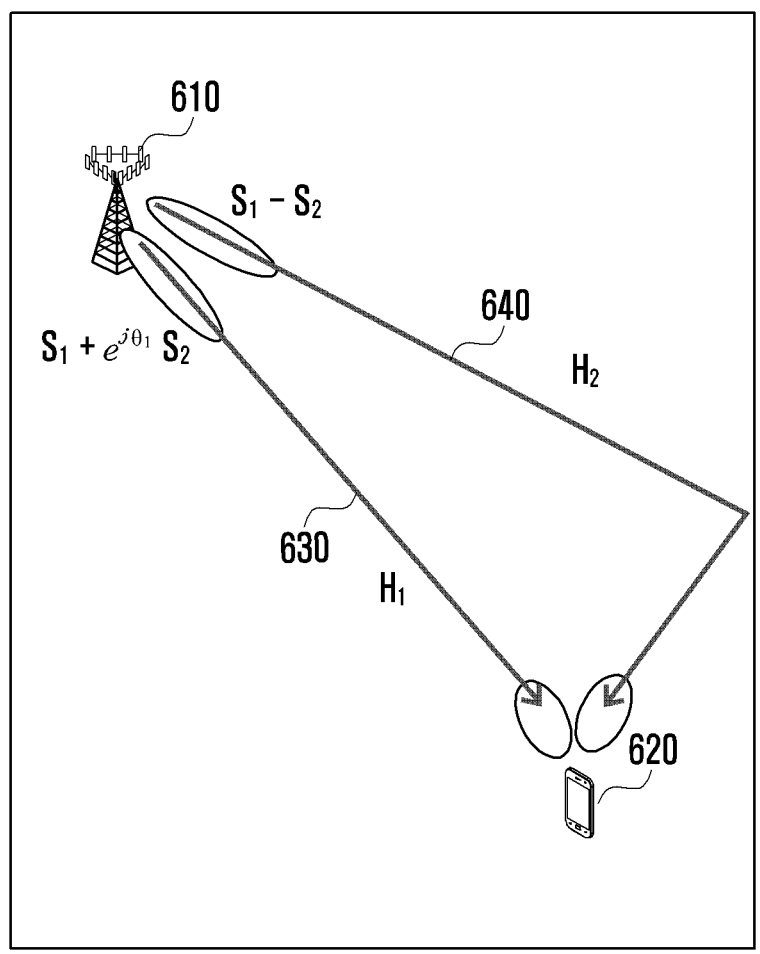
FIG. 6 is a diagram illustrating a signal transmission/reception method according to an embodiment of the present invention.

FIG. 6 is a diagram illustrating a signal transmission/reception method according to an embodiment of the present invention.

FIG. 6 depicts a method of SM transmission with multiple antennas. That is, it may be possible to generate a constellation diagram in which a plurality of symbols of an antenna are mapped. Here, it may be possible to use a constellation mapping rule per antenna. The mapping rule may map N combinations obtained by multiplexing the symbols to M constellation points. The values of the M constellation points may be determined differently according to the channel quality of the antenna link. The eNB or the UE may determine the best mapping rule per antenna based on the estimated channel information. This method is described in more detail hereinafter.

In reference to FIG. 6, the first symbol $s_1$ (hereinafter, interchangeably referred to as symbol 1) may be transmitted from the eNB 610 to the UE 620 through multiple antennas without phase rotation. Meanwhile, the second symbol $s_2$ (hereinafter, interchangeably referred to as symbol 2) may be transmitted from the eNB 610 to the UE 620 through multiple antennas in the state of being phase-rotated to different degrees.

As shown in FIG. 6, the eNB 610 may configure one Tx beam over the LoS link 630 and another Tx beam over the NLoS link 640 in the direction to the UE 620. Then, the UE 620 may configure one Rx beam over the LoS link 630 and another Rx beam over the NLoS link 640 in the direction to the eNB 610. Although such configurations are assumed for convenience of explanation, it is obvious that both the two beams can be configured over the NLoS link. The first symbol $s_1$ may be transmitted from the eNB 610 to the UE 620 without phase rotation at the antenna for the LoS link 630 and the antenna for the NLoS link 640. Meanwhile, the second symbol $s_2$ may be transmitted from the eNB 610 to the UE 620 in the form of $$e^{j\theta_1} s_2$$

phase-rotated as much as θ1 at the antenna for the NLoS link 640. Also, the second symbol may be transmitted from the eNB 610 to the UE 620 in the state of $-s_2$ being phase-rotated as much as −1 over the NLoS link 640.

In this case, the signals $y_1$ and $y_2$ received by two antennas of the UE 620 may be expressed as Equation (5).

$$\begin{bmatrix} y_1 \\ y_2 \end{bmatrix} = \begin{bmatrix} H_1 & h_2 \\ h_1 & H_2 \end{bmatrix} \begin{bmatrix} 1/\sqrt{2} & e^{j\theta_1}/\sqrt{2} \\ 1/\sqrt{2} & -1/\sqrt{2} \end{bmatrix} \begin{bmatrix} s_1 \\ s_2 \end{bmatrix} + \begin{bmatrix} n_1 \\ n_2 \end{bmatrix} = \frac{1}{\sqrt{2}} \begin{bmatrix} H_1 + h_2 & e^{j\theta_1} H_1 - h_2 \\ h_1 + H_2 & e^{j\theta_1} h_1 - H_2 \end{bmatrix} \begin{bmatrix} s_1 \\ s_2 \end{bmatrix} + \begin{bmatrix} n_1 \\ n_2 \end{bmatrix} \quad (5)$$

Here, $H_1$ denotes a channel component between the eNB's Tx beam and the UE's Rx beam formed over the LoS link 630, $H_2$ denotes a channel component between the eNB's Tx beam and the UE's Rx beam formed over the NLoS link 640, $h_2$ and $h_1$ denote channel components between the eNB's Tx beam and the UE's Rx beam formed in different directions, $s_1$ and $s_2$ denote two different symbols transmitted by two Tx antennas of the eNB 610, and $n_1$ and $n_2$ denote noise and interference signals received by two Rx antennas of the UE 620.

$$\begin{bmatrix} 1/\sqrt{2} & e^{j\theta_1}/\sqrt{2} \\ 1/\sqrt{2} & -1/\sqrt{2} \end{bmatrix}$$

denotes a precoding matrix according to an embodiment of the present invention and, in this case, the effective channels may be expressed by $$\frac{1}{\sqrt{2}} \begin{bmatrix} H_1 + h_2 & e^{j\theta_1} H_1 - h_2 \\ h_1 + H_2 & e^{j\theta_1} h_1 - H_2 \end{bmatrix}$$

as shown in Equation (5).

The Tx signals $x_1$ and $x_2$ transmitted by two antennas of the eNB 610 may be expressed as Equation (6).

$$\begin{bmatrix} x_1 \\ x_2 \end{bmatrix} = \frac{1}{\sqrt{2}} \begin{bmatrix} s_1 + e^{j\theta_1} s_2 \\ s_1 + s_2 \end{bmatrix} \quad (6)$$

Here, the signal $x_1$ being transmitted by the first Tx antenna designated for forming an analog beam over the LoS link 630 includes both the symbols $s_1$ and $s_2$, and the signal $x_2$ being transmitted by the second Tx antenna designated for forming an analog beam over the NLoS link 640 also includes both the symbols $s_1$ and $s_2$.

Assuming the number of available combinations for two symbols s1 and s2 is N, the N combinations may be mapped to the combinations expressed as constellation points for the LOS link. Also, the N combinations may be mapped to M points of the constellation diagram for the NLoS link. Here, M is equal to or less than N.

Meanwhile, the UE 620 may determine a phase rotation value based on the multi-antenna channel information and send the phase rotation value to the eNB 610. The eNB 610 may transmit channel measurement configuration information to the UE 620. The channel measurement configuration information may include a number of antenna ports for channel measurement based on cell-specific Reference Signal (RS) or UE-specific RS, RS pattern, RS subframe structure and period, and RS subframe offset. The channel measurement configuration information may be transmitted through a downlink control channel such as a Master Information Block (MIB) of a Physical Broadcast Channel (PBCH) or a downlink data channel such as a System Information Block (SIB) of a Physical Downlink Shared Channel (PDSCH) or an RRC message. The channel measurement configuration information may also include the information of a path on which the UE has to perform channel measurement. The UE 620 may determine phase rotation values to be applied to the respective antennas based on the measured channel information and may transmit the corresponding information to the eNB 610. According to an embodiment, the UE 620 may transmit to the eNB 610 the phase rotation value along with the channel information or through a separate message. The UE 620 may transmit the channel information periodically. For example, the UE 620 may be configured to perform channel measurement periodically, and it may transmit the channel measurement result to the eNB 610 periodically. It may also be possible to transmit the channel information to the eNB 610 aperiodically. For example, if the UE 620 is configured to perform channel measurement aperiodically, it may transmit the channel measurement result to the eNB 610 aperiodically. Meanwhile, the channel information may be transmitted through an uplink data channel such as Physical Uplink Shared Channel (PUSCH) or an uplink control channel such as Physical Uplink Control Channel (PUCCH). For example, if the channel measurement is performed aperiodically, the channel information may be transmitted through the uplink data channel. If the channel measurement is performed periodically, the channel information may be transmitted through the uplink control channel. The channel information that the UE 620 reports to the eNB 610 may include a Channel Quality Indicator (CQI), a Rank Indicator (RI), a Precoding Matrix Indicator (PMI), and phase rotation values to be applied to the respective antennas. According to an embodiment, the phase rotation value feedback from the UE 620 to the eNB 610 may be performed in a Frequency Division Duplex (FDD) system.

According to an embodiment, the eNB 610 may determine the phase rotation values for uplink SM and transmit the phase rotation values to the UE 620. That is, if the channel measurement configuration information is received from the UE 620, the eNB 610 may determine the phase rotation values to be applied to the respective antennas based on the channel measurement configuration information. Then, the eNB 610 may transmit the information on the determined phase rotation values to the UE 620. According to an embodiment, the phase rotation value transmission from the eNB 610 to the UE 620 may be performed in a Time Division Duplex (TDD) system.

According to an embodiment, the codebook for use in transmitting the phase rotation values may be configured differently per antenna based on average channel power difference.

The phase rotation value determination method is described later in detail.

Figure 7:
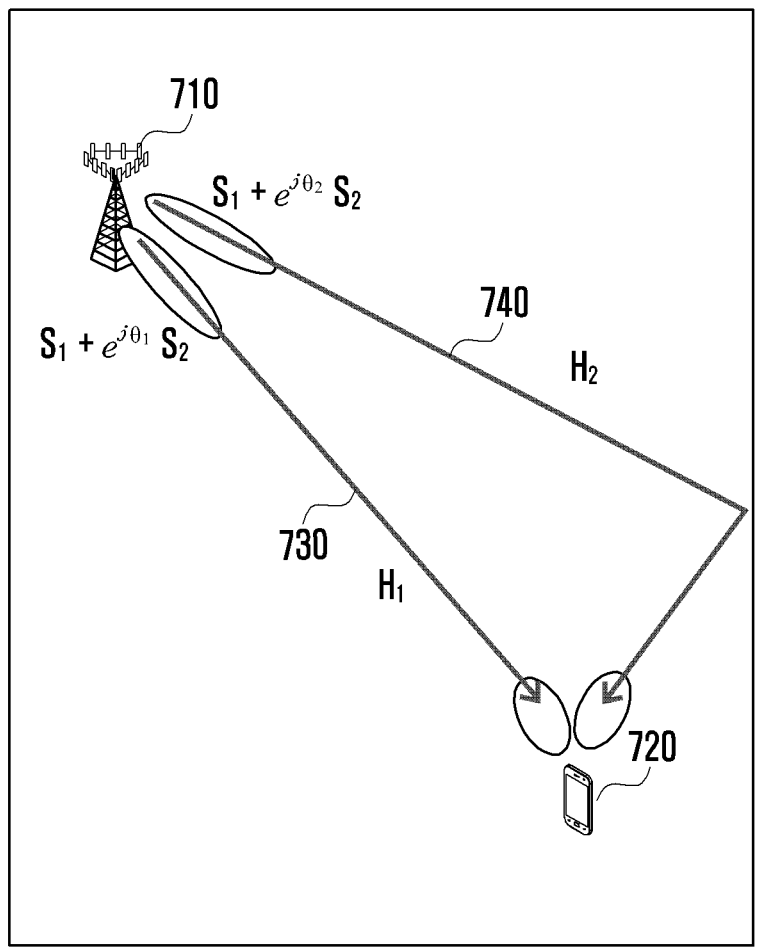
FIG. 7 is a diagram illustrating a signal transmission/reception method according to another embodiment of the present invention.

FIG. 7 is a diagram illustrating a signal transmission/reception method according to another embodiment of the present invention.

In reference to FIG. 7, the first symbol $s_1$ may be transmitted from the eNB 710 to the UE 720 through multiple antennas without phase rotation. Meanwhile, the second symbol $s_2$ may be transmitted from the eNB 710 to the UE 720 through multiple antennas in the state of being phase-rotated by different degrees.

As shown in FIG. 7, the eNB 710 may configure one Tx beam over the LoS link 730 and another Tx beam over the NLoS link 740 in the direction to the UE 720. Then, the UE 720 may configure one Rx beam over the LoS link 730 and another Rx beam over the NLoS link 740 in the direction to the eNB 710. Although such configurations are assumed for convenience of explanation, it is obvious that both the two beams can be configured over the NLoS link. The first symbol $s_1$ may be transmitted from the eNB 710 to the UE 720 without phase rotation at the antenna for the LoS link 730 and the antenna for the NLoS link 740. Meanwhile, the second symbol $s_2$ may be transmitted from the eNB 710 to the UE 720 in the form of $$e^{j\theta_1}s_2$$

phase-rotated as much as θ1 at the antenna for the LoS link 730. Also, the second symbol may be transmitted from the eNB 710 to the UE 720 in the form of $$e^{j\theta_2}s_2$$

phase-rotated as much as θ2 over the NLoS link 740.

In this case, the signals $y_1$ and $y_2$ received by two antennas of the UE 720 may be expressed as Equation (7).

$$\begin{bmatrix} y_1 \\ y_2 \end{bmatrix} = \begin{bmatrix} H_1 & h_2 \\ h_1 & H_2 \end{bmatrix} \begin{bmatrix} 1/\sqrt{2} & e^{j\theta_1}/\sqrt{2} \\ 1/\sqrt{2} & e^{j\theta_2}/\sqrt{2} \end{bmatrix} \begin{bmatrix} s_1 \\ s_2 \end{bmatrix} + \begin{bmatrix} n_1 \\ n_2 \end{bmatrix} \quad (7)$$

Here, $H_1$ denotes a channel component between the eNB's Tx beam and the UE's Rx beam formed over the LoS link 730, $H_2$ denotes a channel component between the eNB's Tx beam and the UE's Rx beam formed over the NLoS link 740, $h_2$ and $h_1$ denote channel components between the eNB's Tx beam and the UE's Rx beam formed in different directions, $s_1$ and $s_2$ denote two different symbols transmitted by two Tx antennas of the eNB 710, and $n_1$ and $n_2$ denote noise and interference signals received by two Rx antennas of the UE 720.

$$\begin{bmatrix} 1/\sqrt{2} & e^{j\theta_1}/\sqrt{2} \\ 1/\sqrt{2} & e^{j\theta_2}/\sqrt{2} \end{bmatrix}$$

denotes a precoding matrix according to an embodiment of the present invention and, in this case, the effective channels may be expressed by $$\frac{1}{\sqrt{2}} \begin{bmatrix} H_1 + h_2 & e^{j\theta_1}H_1 + e^{j\theta_2}h_2 \\ h_1 + H_2 & e^{j\theta_1}h_1 + e^{j\theta_2}H_2 \end{bmatrix}.$$

The Tx signals $x_1$ and $x_2$ transmitted by two antennas of the eNB 710 may be expressed as Equation (8).

$$\begin{bmatrix} x_1 \\ x_2 \end{bmatrix} = \frac{1}{\sqrt{2}} \begin{bmatrix} s_1 + e^{j\theta_1}s_2 \\ s_1 + e^{j\theta_2}s_2 \end{bmatrix}$$

Here, the signal $x_1$ being transmitted by the first Tx antenna designated for forming an analog beam over the LoS link 730 includes both the symbols $s_1$ and $s_2$, and the signal $x_2$ being transmitted by the second Tx antenna designated for forming an analog beam over the NLoS link 740 also includes both the symbols $s_1$ and $s_2$.

Assuming the number of possible combinations of two symbols $s_1$ and $s_2$ is N, the N combinations may be mapped to $M_1$ constellation points of the constellation diagram for the LOS link. Also, the N combinations may be mapped to $M_2$ constellation points of the constellation diagram for the NLoS link. Here, $M_1$ and $M_2$ are equal to or less than N.

The UE 720 may determine the phase rotation values $\theta_1$ and θ based on the multi-antenna channel information and send the phase rotation values to the eNB 710. The eNB 710 may apply the phase rotation values received from the UE 720 to certain symbol combinations to protect against received signal quality degradation. According to an embodiment, the phase rotation value feedback from the UE 720 to the eNB 710 may be performed in a Frequency Division Duplex (FDD) system. The detailed operation thereof is similar to that described with reference to FIG. 6 and thus omitted herein.

According to an embodiment, the eNB 710 may determine the phase rotation values $\theta_1$ and $\theta_2$ for uplink SM and transmit the phase rotation values to the UE 720. According to an embodiment, the phase rotation value transmission from the eNB 610 to the UE 620 may be performed in a Time Division Duplex (TDD) system. The detailed operation thereof is similar to that described with reference to FIG. 6 and thus omitted herein.

According to an embodiment, the codebook for use in transmitting the phase rotation values may be configured differently per antenna based on average channel power difference.

Meanwhile, the phase rotation values θ1 and θ2 are used to minimize symbol detection errors on the effective channels that the symbols $s_1$ and $s_2$ experience. Assuming that two arbitrary symbol combinations possible for two symbol pairs in a given modulation constellation diagram are [$s_1$, $s_2$] and [$s_1'$, $s_2'$], the distance between the two combinations in a situation without noise may defined as Equation (9).

$$dist\left(\begin{bmatrix} s_1 \\ s_2 \end{bmatrix}, \begin{bmatrix} s_1' \\ s_2' \end{bmatrix}\right) = \left\| \begin{bmatrix} (H_1 + h_2)(s_1 - s_1') + (e^{j\theta_1}H_1 + e^{j\theta_2}h_2)(s_2 - s_2') \\ (h_1 + H_2)(s_1 - s_1') + (e^{j\theta_1}h_1 + e^{j\theta_2}H_2)(s_2 - s_2') \end{bmatrix} \right\|^2. \quad (9)$$

According to an embodiment of the present invention, it may be possible to determine the phase rotation values $\theta_1$ and $\theta_2$ so as to maximize the least value of the distance between the combinations corresponding to the arbitrary symbol pairs. This may be expressed by Equation (10).

$$(\hat{\theta}_1, \hat{\theta}_2) = \underset{\theta_1, \theta_2}{\operatorname{argmax}}\left(\underset{s_1, s_2, s_1', s_2'}{\min}\left(dist\left(\begin{bmatrix} s_1 \\ s_2 \end{bmatrix}, \begin{bmatrix} s_1' \\ s_2' \end{bmatrix}\right)\right)\right) \quad (10)$$

For example, in the QPSK modulation, an arbitrary symbol $s_1$ may be mapped to one of four points of the constellation diagram; thus, the number of possible cases of arbitrary symbol pair combinations [$s_1$, $s_2$] or [$s_1'$, $s_2'$] is 16. By taking notice of the total number of cases for selecting a pair of two arbitrary symbols, the total number of distance values that can be produced by Equation (9) may become $_{16}C_2$=120. The UE or eNB may determine the phase rotation values $\theta_1$ and $\theta_2$ capable of maximizing the least value of the 120 distance values for the given channel matrix and use the determined phase rotation values for signal transmission of the eNB.

Figure 8:
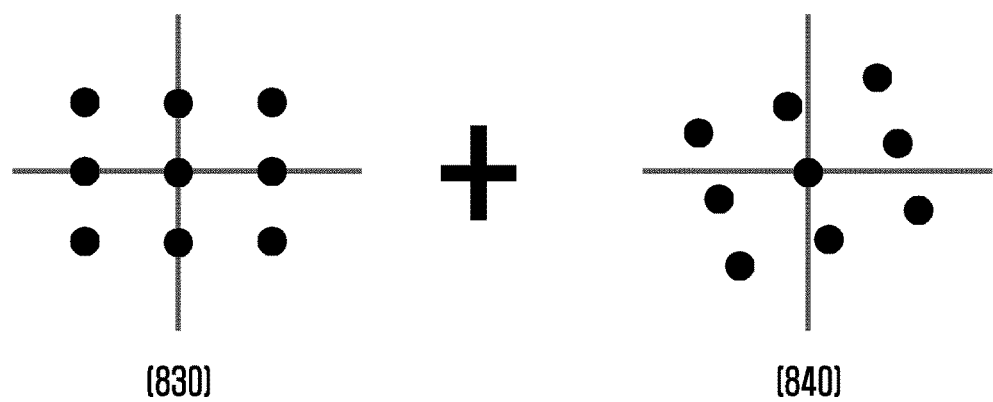
FIG. 8 is a diagram illustrating constellations for symbol combinations according to an embodiment of the present invention.

FIG. 8 is a diagram illustrating constellations for symbol combinations according to an embodiment of the present invention.

According to an embodiment of the present invention, if different constellation mapping rules are applied to the antennas, the symbol combinations transmitted by the respective antennas are distinctively mapped in the constellation diagram as denoted by reference number 830 and 840.

The above description has been made of the method for solving the symbol detection ambiguity problem by transmitting the symbols through multiple antennas in the state of being differently phase-rotated.

Hereinafter, a description is made of the method for solving the symbol detection ambiguity problem by adjusting the possible combinations of two symbols.

Figure 9:
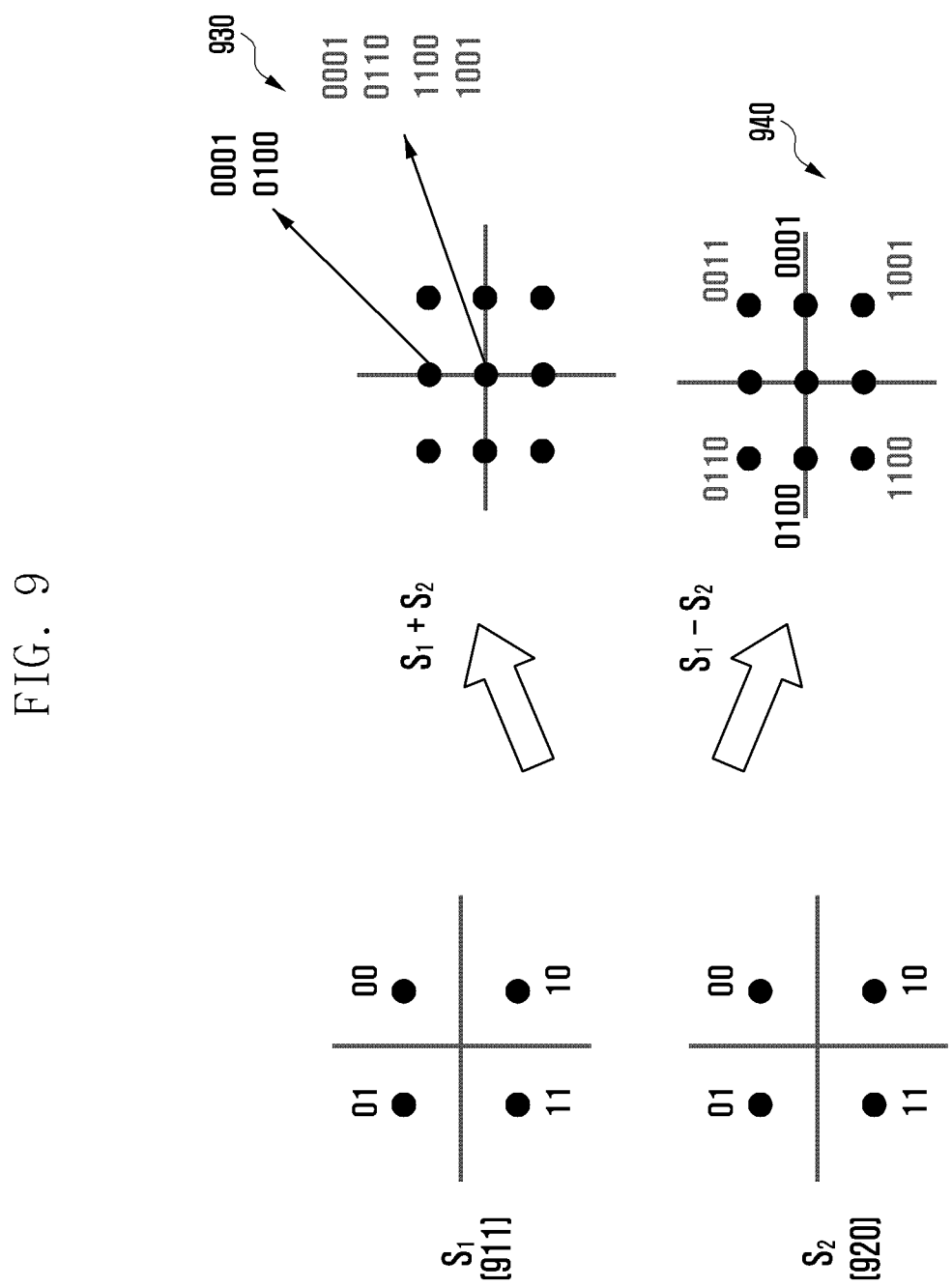
FIG. 9 is a diagram illustrating exemplary symbol constellations.
Figure 10:
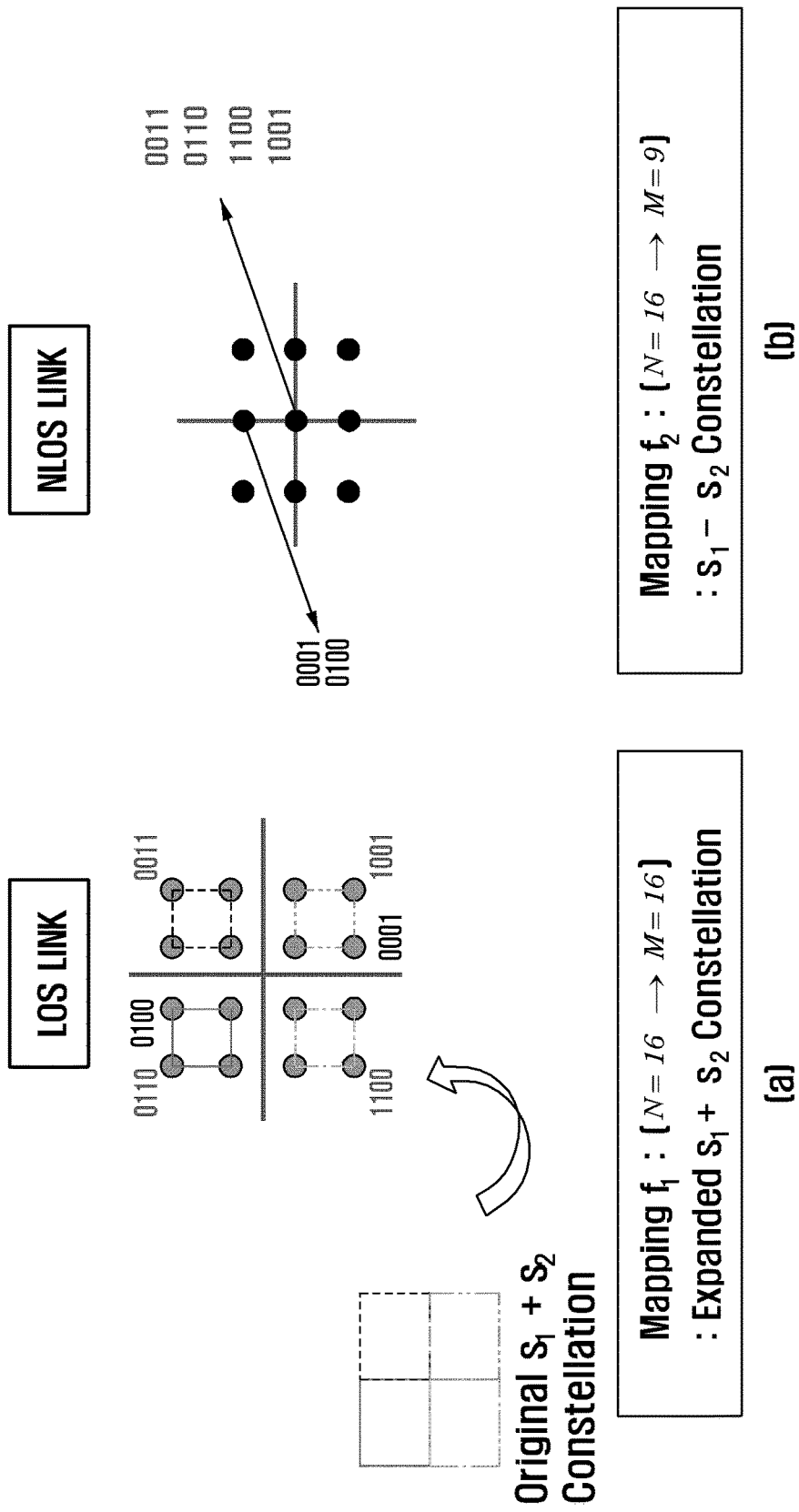
FIG. 10 is a diagram for explaining symbol constellations according to an embodiment of the present invention.
Figure 11:
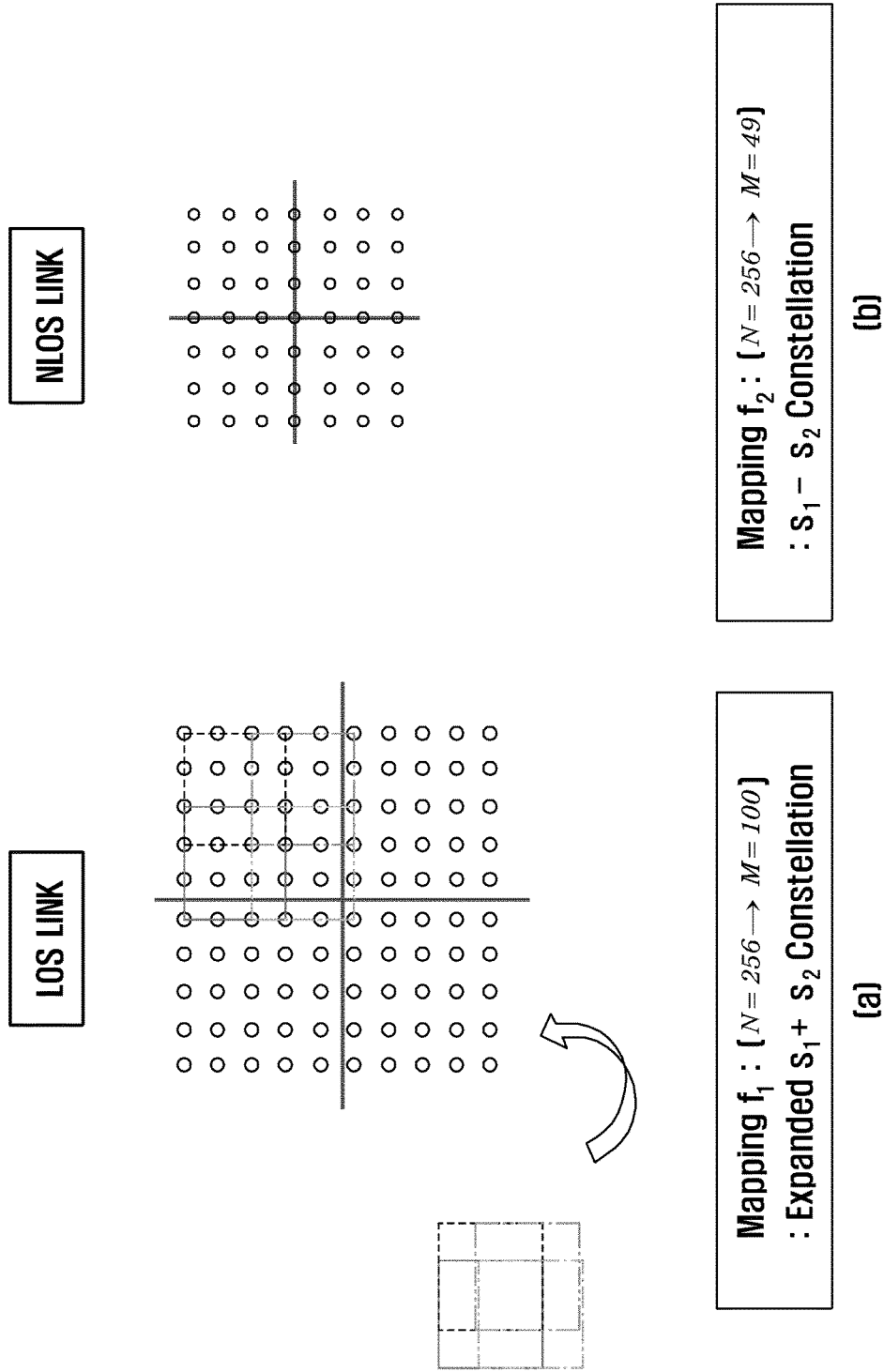
FIG. 11 is a diagram for explaining symbol constellations according to another embodiment of the present invention.

FIG. 9 is a diagram illustrating exemplary symbol constellations, FIG. 10 is a diagram for explaining symbol constellations according to an embodiment of the present invention, and FIG. 11 is a diagram for explaining symbol constellations according to another embodiment of the present invention.

According to an embodiment of the present invention, the signals $x_0$ and $x_1$ being transmitted by two antennas of an eNB may be pre-coded as Equation (11).

$$\begin{bmatrix} x_1 \\ x_2 \end{bmatrix} = \frac{1}{\sqrt{2}} \begin{bmatrix} s_1 + a_1 s_2 \\ s_1 - a_2 s_2 \end{bmatrix} \quad (11)$$

The signal $x_1$ transmitted by the first Tx antenna designated for forming an analog beam over the LoS link may be generated by applying $a_1$ and $a_2$ to protect against a constellation overlap phenomenon of the first and second symbols.

For example, if the two symbols $s_1$ 910 and $s_2$ 920 are QPSK symbols and $a_1$=$a_2$=1 is fulfilled, the total number of combinations is 16. However, in the case of mapping the combinations in a real constellation diagram, they may be expressed with at most 9 constellation points as shown in FIG. 9. This means that the 16 combinations are mapped to 9 constellation points; thus, ambiguity occurs for 7 combinations. For example, in the case of the beam formed over the LoS link for transmitting the $s_1$+$s_2$ symbol, the symbol combinations 0001 and 0100, among all symbol combinations of the two symbols s1 910 and s2 920, may be mapped to one point on the constellation diagram and the symbol combinations 0011, 0110, 1100, and 1001 may also be mapped to another one point on the constellation diagram as denoted by reference number 930. Meanwhile, in the case of the beam formed over the NLoS link for transmitting the $s_1$-$s_2$ symbol, the symbol combinations 0001, 0100, 0011, 0110, 1100, and 1001, among all symbol combinations of the two symbols s1 910 and s2 920, may be mapped to different points on the constellation diagram as denoted by reference number 940. However, if an error occurs in detecting the $s_1$-$s_2$ symbol at the second antenna of the UE that is designated for forming an analog beam over the NLoS link, it is impossible to overcome the ambiguity problem.

In order to solve this problem, it may be possible to use the constellation diagrams for protecting against the overlap as shown in FIGS. 10 and 11 by adjusting $a_1$ and $a_2$ for the signal being transmitted through an antenna with a high link quality (e.g., antenna designated for the LoS link).

A detailed description thereof is made with reference to FIGS. 10 and 11. The N available combinations of two symbols $s_1$ and $s_2$ may be mapped to $M_1$ constellation points of the constellation diagram for the first antenna and to $M_2$ constellation points of the constellation diagram for the second antenna. The UE may detect the symbol $s_1$ mapped to one of M1 points of the constellation diagram for the first antenna and the symbol $s_2$ mapped to one of M2 points of the constellation diagram for the second antenna.

In reference to FIG. 10, if the two symbols $s_1$ and $s_2$ are QPSK symbols, the total number of available combinations of the two symbols N is 16 (N=4×4=16). The eNB may pre-code the signals $x_1$ and $x_2$ to be transmitted to the UE using Equation (11). In this case, the eNB may adjust $a_1$ and $a_2$ to map the signal to be transmitted through the antenna with the higher link quality (LoS link antenna) to one point of the constellation diagram with 16 constellation points to avoid overlapped mapping, as shown in part (a) of FIG. 10. In this case, $M_1$ may be 16, which is equal to N, i.e., the total number of available combinations $s_1$ and $s_2$. Meanwhile, the eNB may not perform any operation for avoiding such an overlap on the signal to be transmitted through the antenna with a relatively low link quality (NLoS link antenna). That is, the combination of the symbols $s_1$ and $s_2$ may be mapped to one point of the constellation diagram with 9 constellation points for the NLoS link as shown in part (b) of FIG. 10. Although not shown in the drawing, the eNB may also map the signal to be transmitted through the antenna with the relatively low link quality to one point of the constellation diagram with 16 constellation points to avoid any overlapped mapping. In this case, $M_2$ may be 16, which is equal to N, i.e., the total number of available combinations $s_1$ and $s_2$. According to an embodiment, $M_1$ and $M_2$ may be less than 16, i.e., the total number of available combinations $s_1$ and $s_2$.

With this configuration, although an error occurs in detecting the symbol transmitted by the second antenna with the low link quality (e.g., antenna for NLoS link), if the symbol transmitted by the first antenna with the high link quality (e.g., antenna for LoS link) is detected successfully, it is possible to determine the symbols constituting the combination.

In reference to FIG. 11, if the two symbols $s_1$ and $s_2$ are 16QAM symbols, the total number of available combinations of the two symbols N is 256 (N=16×16=256). The eNB may pre-code the signals $x_1$ and $x_2$ to be transmitted to the UE using Equation (11). In this case, the eNB may adjust $a_1$ and $a_2$ to map the signal to be transmitted through the antenna with the higher link quality (LoS link antenna) to one point of the constellation diagram with a large number of constellation points, e.g., 100 points, to avoid overlap mapping, as shown in part (a) of FIG. 11. In this case, $M_1$ may be a value that is a little less than N, i.e., the total number of available combinations of symbols $s_1$ and $s_2$. Meanwhile, the eNB may map the signal to be transmitted through the antenna with the relatively low link quality (NLoS link antenna) to one point of the constellation diagram with 49 constellation points for the combination of symbols $s_1$ and $s_2$ as shown in part (b) of FIG. 11. Although not shown in the drawing, the eNB may also map the signal to be transmitted through the antenna with the relatively low link quality to one point of the constellation diagram with a large number of constellation points, e.g., 100 points, to avoid any overlapped mapping. In this case, $M_2$ may be a value that is a little less than N, i.e., the total number of available combinations $s_1$ and $s_2$.

According to an embodiment, $a_1$ and $a_2$ values may be selected from Table 1 so as to reduce N, i.e., the number of combinations of symbols $s_1$ and $s_2$, to M.

TABLE 1

|  | $a_1$ | M |
|---|---|---|
| If $s_1$ and $s_2$ are QPSK symbols, N = 16 | ½ | 16 |
|  | 1 | 9 |
| If $s_1$ and $s_2$ are 16QAM symbols, N = 256 | ¼ | 256 |
|  | ⅓ | 169 |
|  | ½ | 100 |
|  | 1 | 49 |
| If $s_1$ and $s_2$ are 64QAM symbols, N = 4096 | ⅛ | 4096 |
|  | 1/7 | 3249 |
|  | ⅙ | 2500 |
|  | ⅕ | 1849 |
|  | ¼ | 1296 |
|  | ⅓ | 841 |
|  | 2/1 | 484 |
|  | 1 | 225 |

For example, if $s_1$ and $s_2$ are QPSK symbols and $a_1$ and $a_2$ are 1 and 2 respectively, M is 16. If $s_1$ and $s_2$ are 16QAM symbols and $a_1$ and $a_2$ are 1 and 2 respectively, M is 100.

With this configuration, it may be possible to solve the symbol detection ambiguity using the overlap-free constellation diagram.

The above description has been made of the method for solving the ambiguity problem by adjusting the available combinations of two symbols.

Hereinafter, a description is made of the method for transmitting symbols in a diversity transmission mode.

A MIMO diversity transmission technique is characterized by transmission of one symbol through multiple antennas simultaneously; however, in this case, an antenna with a low average channel power makes it difficult to accomplish a sufficient diversity effect.

According to an embodiment of the present invention, it may be possible to solve such a problem of the diversity transmission by mapping a symbol to one point of each of the per-antenna constellation diagrams having N constellation points. That is, in the case of transmitting the symbol $s_1$ through multiple antennas, the symbol $s_1$ is mapped to one of N constellation points of the constellation diagram for the first antenna with a relatively high channel quality (e.g., antenna for LoS link). That is, the symbol $s_1$ may be mapped to one of the constellation points of the constellation diagram for the first antenna. The symbol may be mapped to one of M constellation points of the constellation diagram for the second antenna with a relatively low channel quality (e.g., antenna for NLoS link). That is, the symbol that can be mapped to one of the N constellation points may be mapped to one of the M constellation points. Here, M is equal to or less than N. In this case, the value of M may be determined in adaptation to the channel quality of the antenna link. The UE may detect the Tx symbol $s_1$ mapped to one of N constellation points and one of M constellation points.

The description thereof is made in detail with reference to the accompanying drawings.

Figure 12:
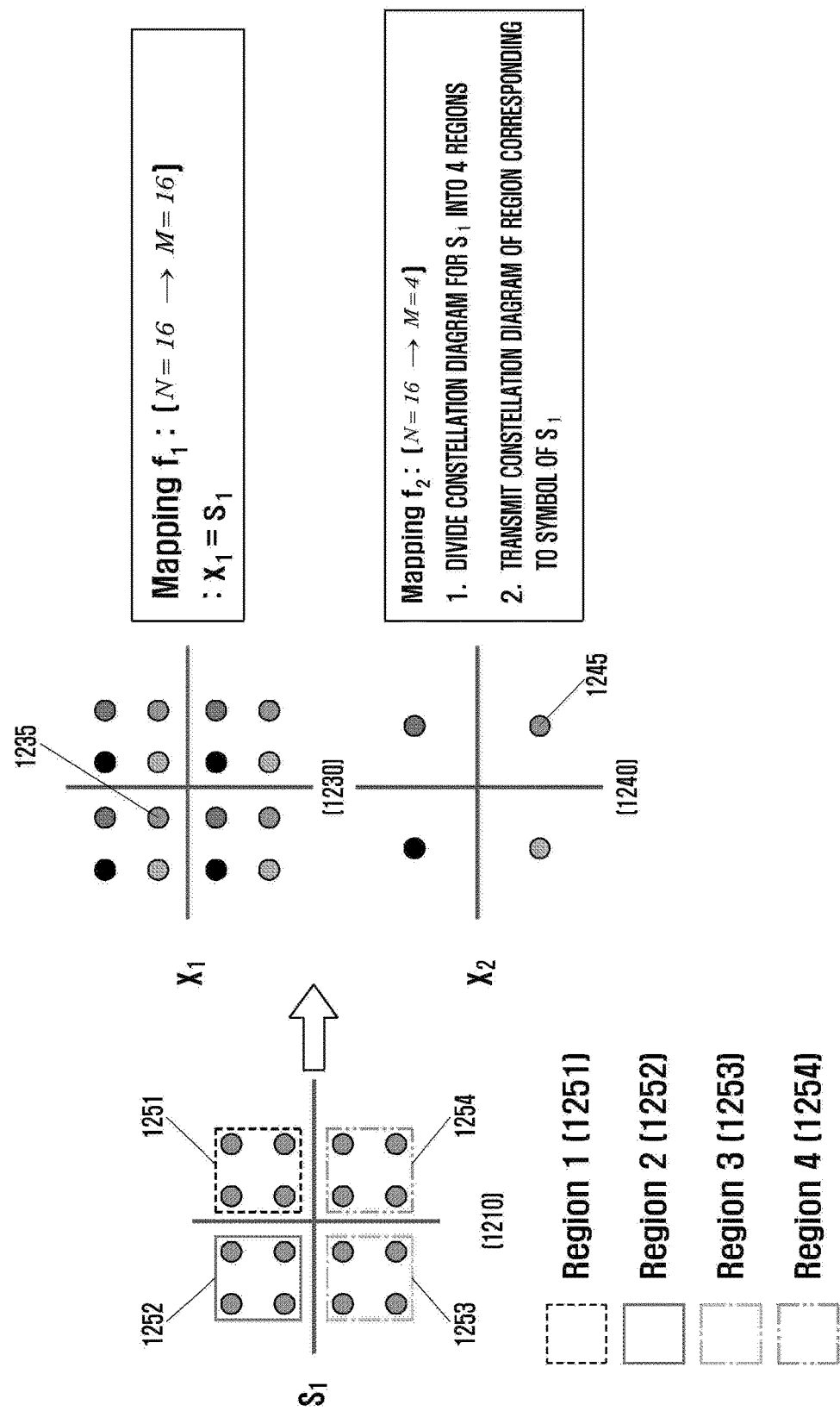
FIG. 12 is a diagram illustrating constellation mapping of Tx signals according to an embodiment of the present invention.
Figure 13:
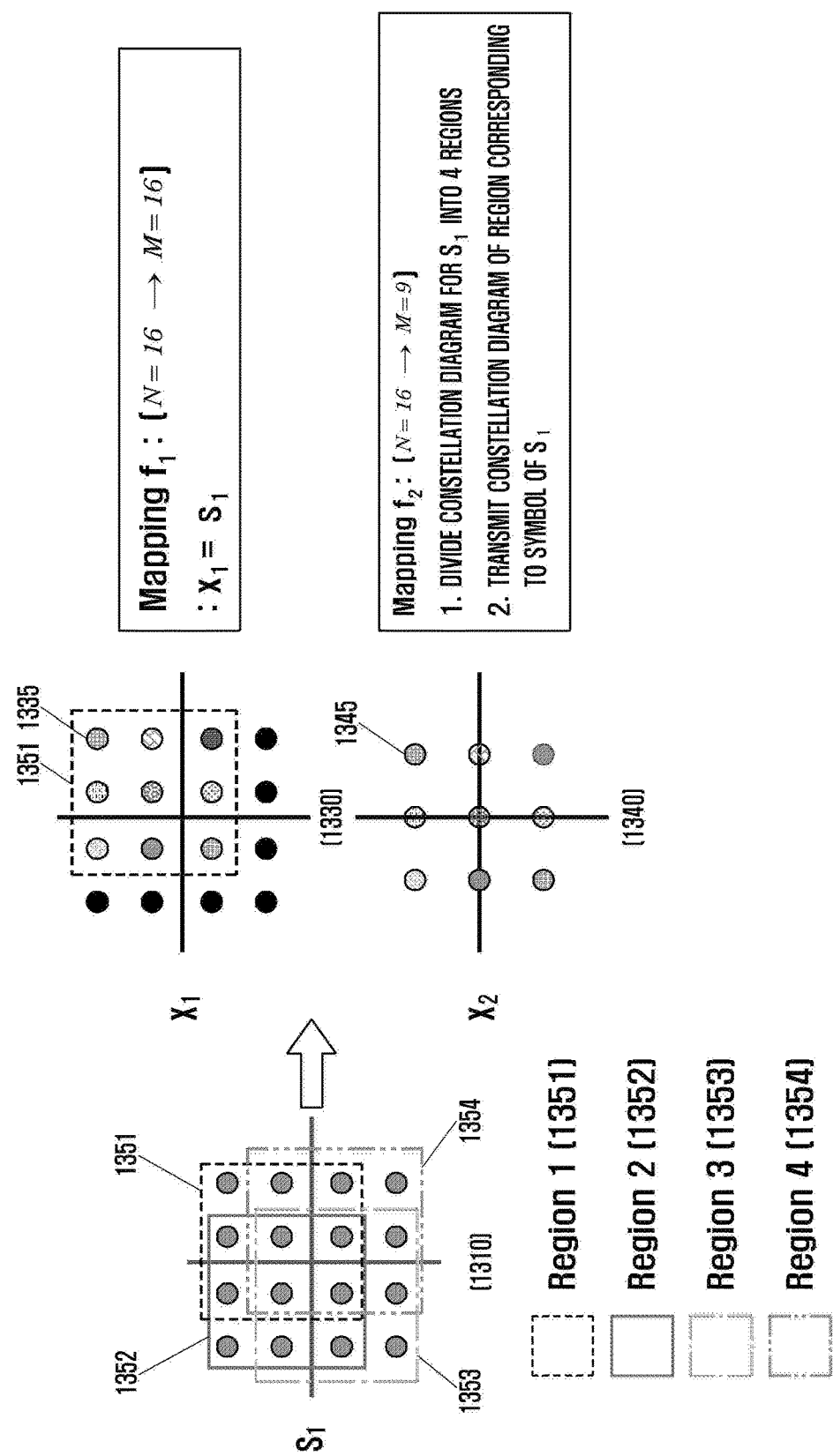
FIG. 13 is a diagram illustrating constellation mapping of Tx signals according to another embodiment of the present invention.

FIG. 12 is a diagram illustrating constellation mapping of Tx signals according to an embodiment of the present invention, and FIG. 13 is a diagram illustrating constellation mapping of Tx signals according to another embodiment of the present invention.

In reference to FIG. 12, a symbol $s_1$ may be mapped to one of 16 constellation points of a constellation diagram 1210. An eNB may transmit the symbol s1 mapped to one of the 16 constellation points of the constellation diagram 1210 using two antennas.

Here, the Tx signal $x_1$ (as a copy of the symbol s1) that is transmitted through the first antenna with a relatively high channel quality may be identical with the symbol $s_1$, in view of constellation mapping, as shown in the constellation diagram 1230. That is, the signal $x_1$ is mapped to one of M (=N=16) constellation points of the constellation diagram 1230, which is identical with the constellation diagram 1210 with the N constellation points to which the symbol $s_1$ can be potentially mapped.

Meanwhile, the signal $x_2$ (as another copy of the symbol $s_1$) that is transmitted through the second antenna with a relatively low channel quality may be represented by one of constellation points of one of four regions of the constellation diagram 1210 for the symbol $s_1$ as denoted by reference number 1240.

As shown in FIG. 12, the constellation diagram 1210 for the symbol $s_1$ may be divided into four regions that are equivalent to 4 quadrants of the constellation diagram. If the symbol $s_1$ is mapped to the bottom right one of the four constellation points of the second quadrant 1252 of the constellation diagram 1210, the Tx signal $x_1$ is represented by the bottom right constellation point 1235 of the second quadrant of the constellation diagram 1230. In this case, the signal $x_2$ that is transmitted through the second antenna is mapped to the constellation point 1245 of the fourth quadrant of the constellation diagram 1240 formed by quadrantally dividing again one quadrant (i.e., the second quadrant) of the constellation diagram 1210.

Table 2 shows information bit streams designated for the respective constellation points in the case of mapping the 16QAM symbol s1 to two transmit antennas according to the mapping rules of f1:(N=16→M=16) and f2:(N=16→M=4).

TABLE 2

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| $f_1$ | 1011 | 1001 | 0010 | 0011 | 1010 | 1000 | 0000 | 0001 | 1101 | 1100 | 0100 | 0110 | 1111 | 1110 | 0101 | 0111 |
| $f_2$ | 1011 | 1001 | 1010 | 1000 | | | | | | | | | | | | |
|   | 0010 | 0011 | 0000 | 0001 | | | | | | | | | | | | |
|   | 1101 | 1100 | 1111 | 1110 | | | | | | | | | | | | |
|   | 0100 | 0110 | 0101 | 0111 | | | | | | | | | | | | |

In the embodiment of FIG. 13, a symbol $s_1$ may be mapped to one of 16 constellation points of a constellation diagram 1310. An eNB may transmit the symbol $s_1$ mapped to one of the 16 constellation points of the constellation diagram 1310 using two antennas.

Similar to the embodiment of FIG. 12, the Tx signal $x_1$ (as a copy of the symbol s1) that is transmitted through the first antenna with a relatively high channel quality may be identical with the symbol $s_1$, in view of constellation mapping, as shown in the constellation diagram 1330. That is, the signal $x_1$ is mapped to one of M (=N=16) constellation points of the constellation diagram 1330, which is identical with the constellation diagram 1310 with the N constellation points to which the symbol $s_1$ can be potentially mapped.

Meanwhile, the signal $x_2$ (as another copy of the symbol $s_1$) that is transmitted through the second antenna with a relatively low channel quality may be represented by one of constellation points of one of multiple regions formed by cropping the constellation diagram 1310 such that the cropped regions are overlapped.

As shown in FIG. 13, the constellation diagram 1310 for the symbol $s_1$ may be cropped into 4 overlap regions equal in size. Unlike the embodiment of FIG. 12 in which each region includes 4 constellation points, the embodiment of FIG. 13 is characterized in that each region includes 9 constellation points. If the symbol $s_1$ is mapped to the top right one of the first quadrant of the constellation diagram 1310, the Tx signal $x_1$ is represented by the top right constellation point 1335 of the first region 1351. In this case, the signal $x_2$ that is transmitted through the second antenna is mapped to the constellation point 1345 of the first quadrant of the constellation diagram 1340 formed by quadrantally dividing the first region 1351. Accordingly, the signal $x_2$ that is transmitted through the second antenna may be represented by the top right constellation point 1345 of the constellation diagram 1340 corresponding to the first region 1340.

Table 3 shows information bit streams designated for the respective constellation points in the case of mapping the 16QAM symbol s1 to two transmit antennas according to the mapping rules of f1:(N=16→M=16) and f2:(N=16→M=9).

The above description has been made of the symbol transmission method in the diversity transmission mode.

Figure 14:
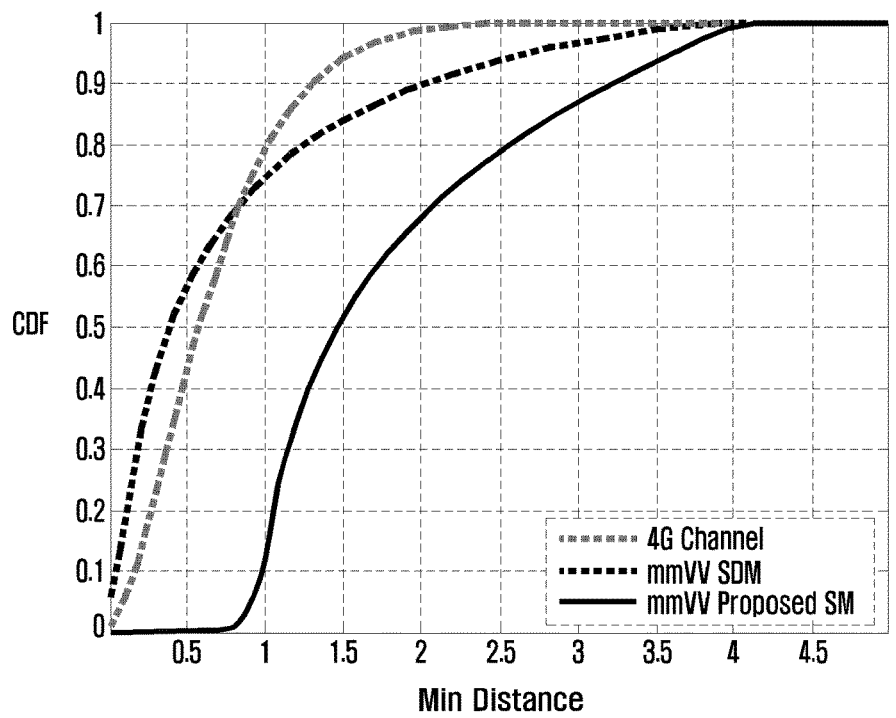
FIGS. 14 and 15 are diagrams illustrating graphs for explaining the advantages of the method according to the embodiments of the present invention.
Figure 14:
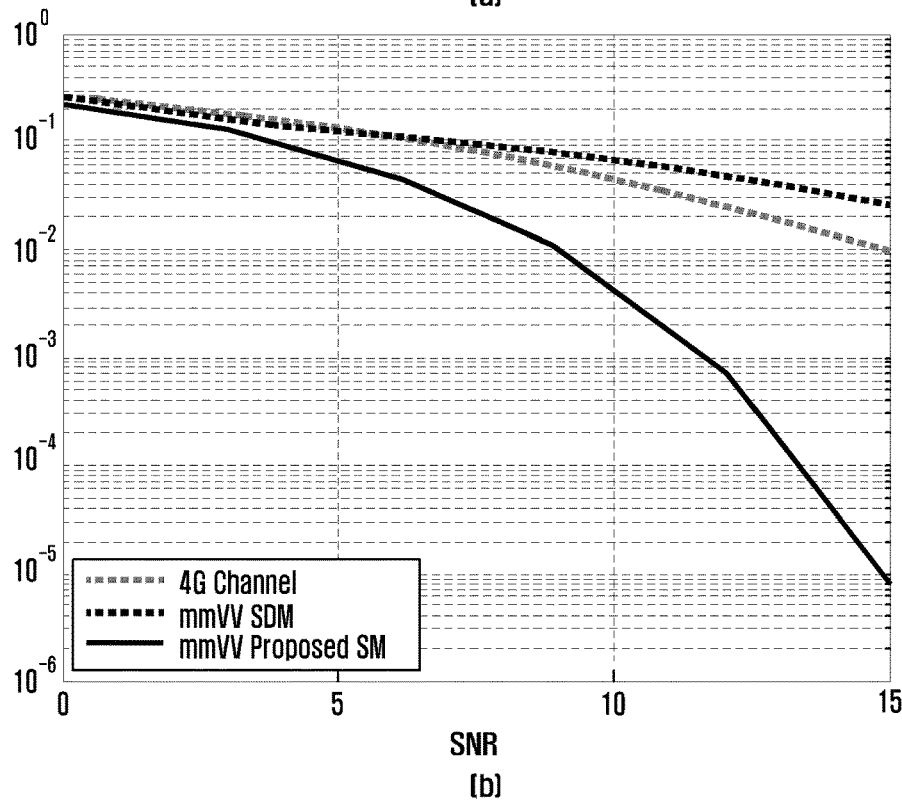
Figure 15:
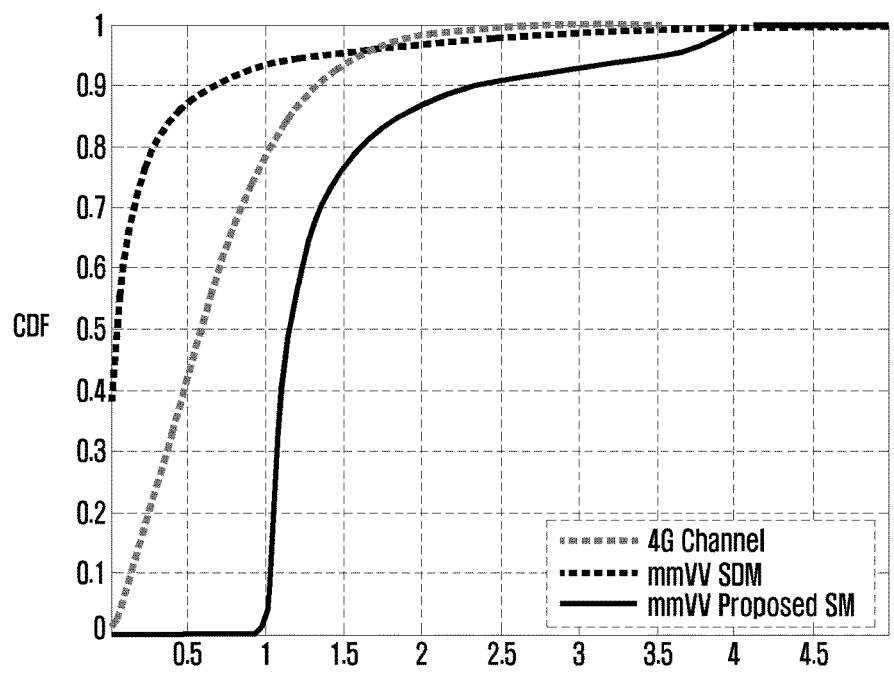
Figure 15:
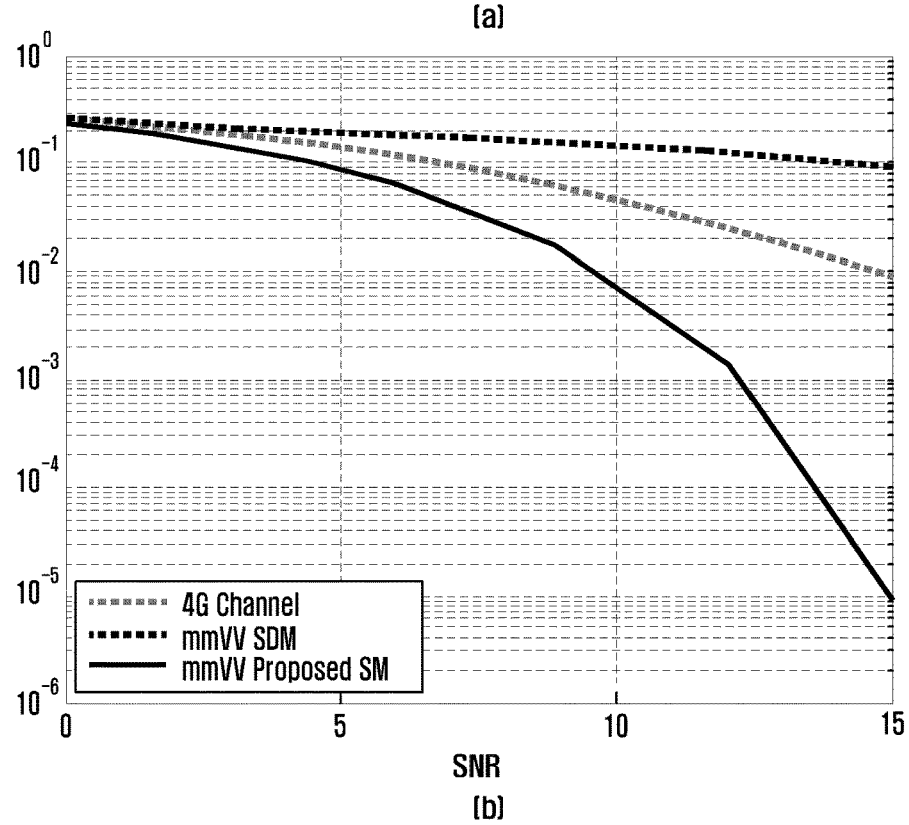
Figure 16:
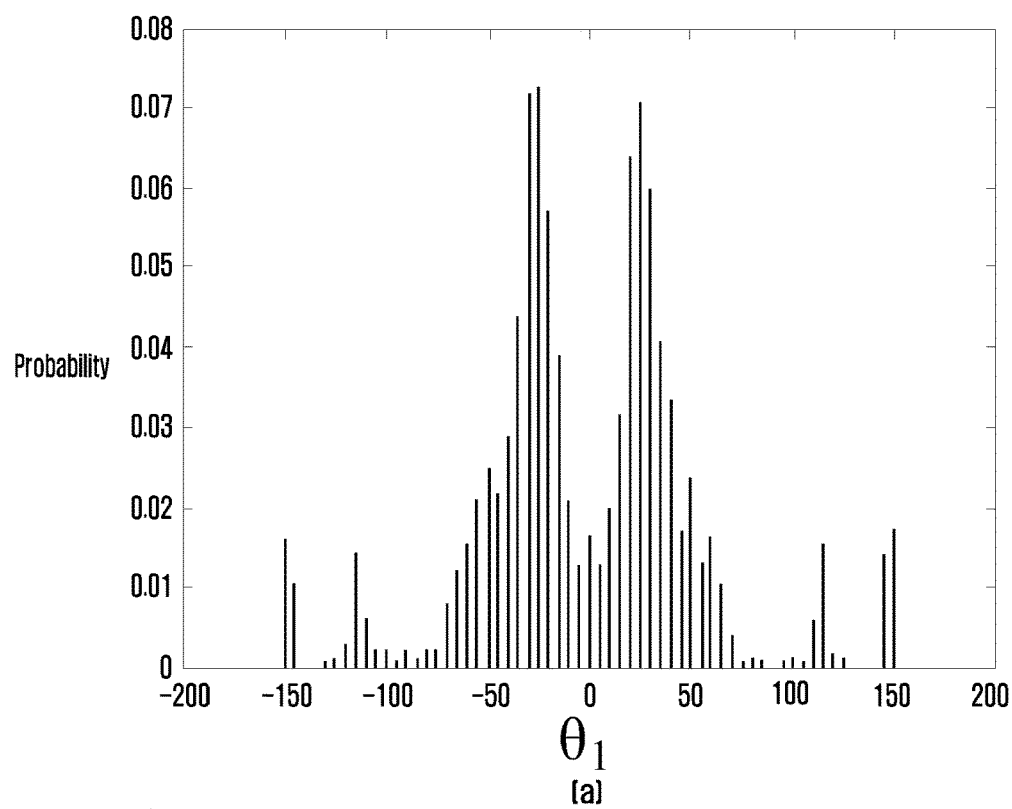
FIG. 16 is a diagram illustrating a graph of distribution of θ according to an embodiment of the present invention.
Figure 16:
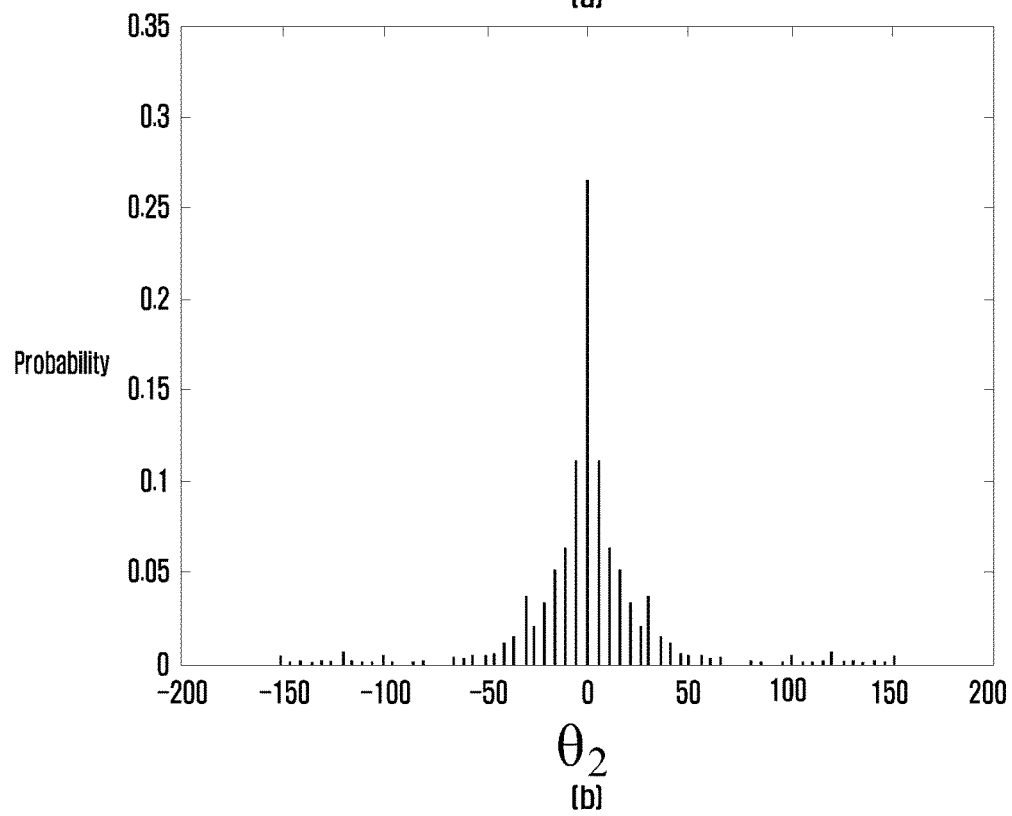

FIGS. 14 and 15 are diagrams illustrating graphs for explaining the advantages of the method according to the embodiments of the present invention, and FIG. 16 is a diagram illustrating a graph of distribution of θ according to an embodiment of the present invention.

Part (a) of FIG. 14 shows the Cumulative Distribution Function (CDF) of minimum distance (Min Distance). Part (b) of FIG. 14 shows simulation results for BER as a function of Signal to Noise Ratio (SNR). It is assumed that the LoS gain (GLoS) is 10 dB and the NLoS gain (GNLoS) is 3 dB. Part (a) of FIG. 15 shows the CDF of Min Distance, and part (b) of FIG. 15 shows simulation results for BER as a function of SNR. Here, it is assumed that the LoS gain (GLoS) is 20 dB and the NLoS gain (GNLoS) is 10 dB.

In reference to FIGS. 14 and 15, it is shown that, in the case of a 4G channel on which a UE transmits signals without beamforming in an LoS environment, the distribution of the Min Distance Metric is concentrated to very low values because of the high correlation characteristic between elements in the channel matrix. Also, it is shown that the legacy BLAST-based SM transmission as represented by Equation (3) and performed in the mmW beamforming system is inferior to the 4G channel transmission without beamforming in view of the Min Distance Metric, particularly at the low distribution region. However, it is shown that the proposed transmission scheme being performed with Equations (5), (7), or (11) is superior in performance to other transmission schemes in the mmW beamforming system in view of the Min Distance Metric. This is because of applying $θ_1$ and $θ_2$ optimized by Equations (9) and (10) for signal transmission. FIG. 16 shows the distribution of $θ_1$ and $θ_2$ determined for instantaneous channels. Part (a) of FIG. 16 is a graph illustrating distribution of θ values under the condition of FIG. 14, and part (b) of FIG. 16 is a graph illustrating distribution of θ values under the condition of FIG. 15.

Figure 17:
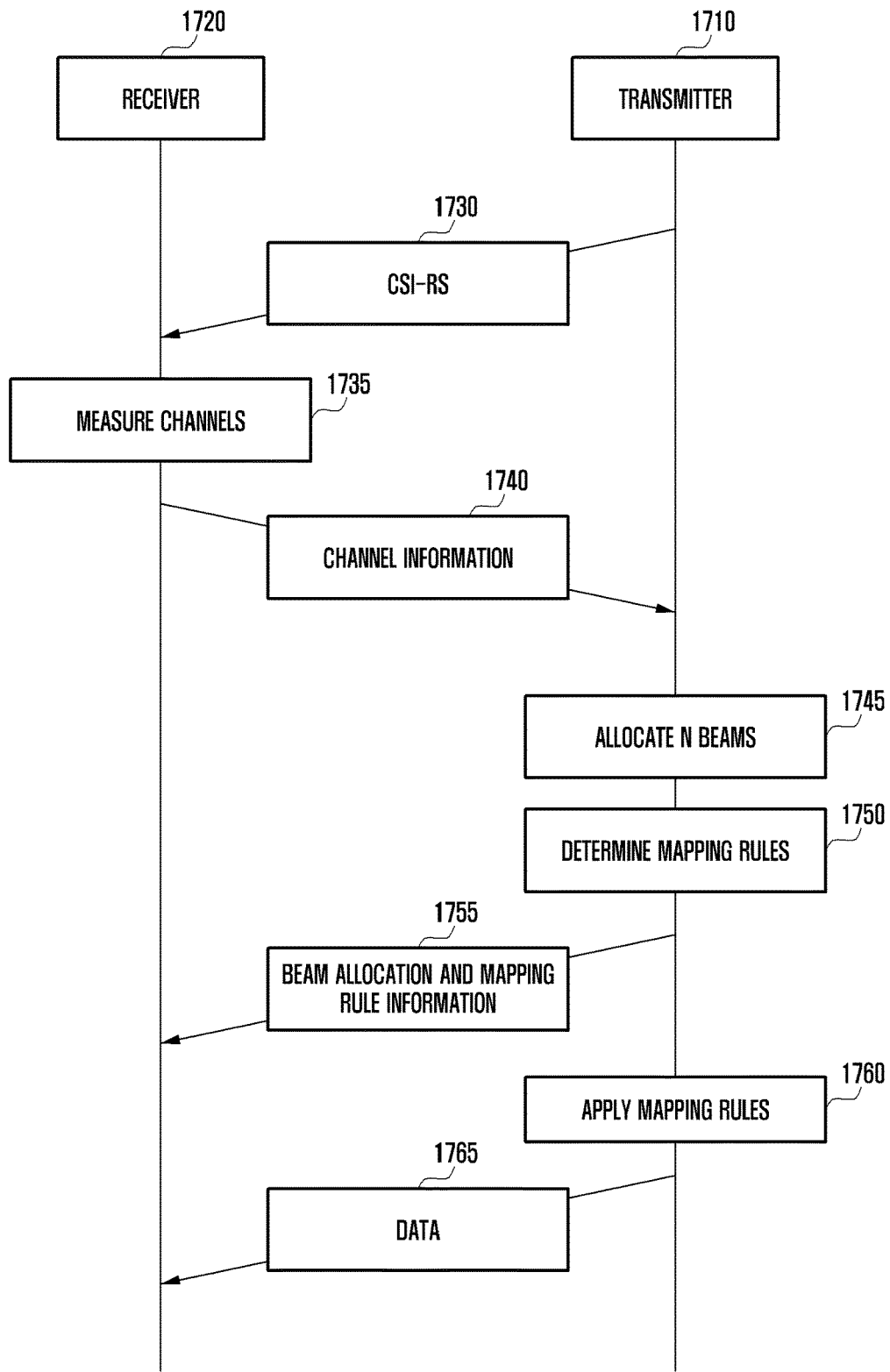
FIG. 17 is a signal flow diagram illustrating signal flows between a transmitter and a receiver according to an embodiment of the present invention.

FIG. 17 is a signal flow diagram illustrating signal flows between a transmitter and a receiver according to an embodiment of the present invention.

TABLE 3

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| $f_1$ | 1011 | 1001 | 0010 | 0011 | 1010 | 1000 | 0000 | 0001 | 1101 | 1100 | 0100 | 0110 | 1111 | 1110 | 0101 | 0111 |
| $f_2$ (if $s_1$ is in Reg. 1) | 1001 | 0010 | 0011 | 1000 | 0000 | 0001 | 1100 | 0100 | 0110 | — | — | — | — | — | — | — |
| $f_2$ (if $s_1$ is in Reg. 2) | 1011 | 1001 | 0010 | 1010 | 1000 | 0000 | 1101 | 1100 | 0100 | | | | | | | |
| $f_2$ (if $s_1$ is in Reg. 3) | 1010 | 1000 | 0000 | 1101 | 1100 | 0100 | 1111 | 1110 | 0101 | | | | | | | |
| $f_2$ (if $s_1$ is in Reg. 4) | 1000 | 0000 | 0001 | 1100 | 0100 | 0110 | 1110 | 0101 | 0111 | | | | | | | |

In reference to FIG. 17, the receiver 1720 may perform channel estimation based on the channel measurement configuration information (e.g., CSI-RS) transmitted by the transmitter 1710 and transmit estimated channel information to the transmitter 1710, which determines transmission beams and mapping rules based on the channel information. According to an embodiment, this method may be applicable to an FFD system.

In detail, the transmitter 1710 may transmit channel measurement configuration information to the receiver 1720 at step 1730. For example, the channel measurement configuration information may include a number of antenna ports for channel measurement based on cell-specific Reference Signal (RS) or UE-specific RS, RS pattern, RS subframe structure and period, and RS subframe offset. The channel measurement configuration information may include CSI-RS. The channel measurement configuration information may be transmitted through a downlink control channel such as the MIB of PBCH or a downlink data channel such as a SIB of PDSCH or an RRC message. The channel measurement configuration information may also include the information of a path on which the UE has to perform channel measurement.

Next, the receiver 1720 may perform channel measurement at step 1735 and transmit channel measurement information to the transmitter 1710 at step 1740. The transmitter 1710 may allocate N beams at step 745 and determine mapping rules according to one of the above-described embodiments at step 1750. For example, the transmitter 1710 may determine a phase rotation value or per-antenna constellation mapping rules.

Next, the transmitter transmits to the receiver 1720 the information on the beam allocation and mapping rule at step 1755 and applies the mapping rule at step 1760 to transmit data to the receiver 1720 at step 1765.

Figure 18:
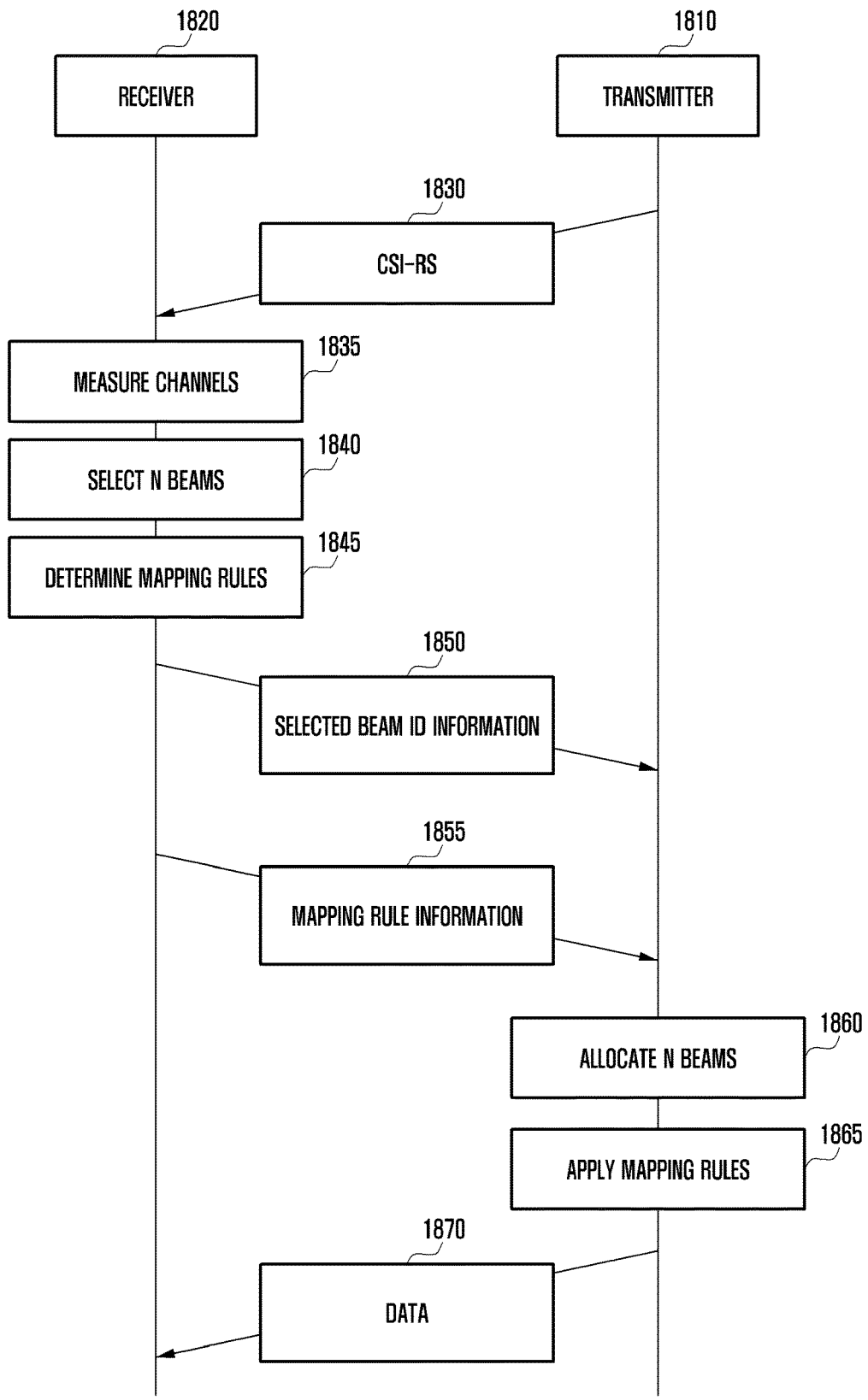
FIG. 18 is a signal flow diagram illustrating signal flows between a transmitter and a receiver according to another embodiment of the present invention.

FIG. 18 is a signal flow diagram illustrating signal flows between a transmitter and a receiver according to another embodiment of the present invention.

In reference to FIG. 18, the receiver 1820 may perform channel estimation based on the channel measurement configuration information (e.g., CSI-RS) transmitted by the transmitter 1810 and transmit estimated channel information to the transmitter 1810, which determines transmission beams and mapping rules based on the channel information. According to an embodiment, this method may be applicable to an FFD system.

In detail, the transmitter 1810 may transmit channel measurement configuration information to the receiver 1820 at step 1830. For example, the channel measurement configuration information may include a number of antenna ports for channel measurement based on cell-specific Reference Signal (RS) or UE-specific RS, RS pattern, RS subframe structure and period, and RS subframe offset. The channel measurement configuration information may include CSI-RS. The channel measurement configuration information may be transmitted through a downlink control channel such as the MIB of PBCH or a downlink data channel such as a SIB of PDSCH or an RRC message. The channel measurement configuration information may also include the information of a path on which the UE has to perform channel measurement.

Next, the receiver 1820 may perform channel measurement at step 1835, select N beams at step 1840, and determine mapping rules according to one of the above-described embodiments at step 1845. For example, the receiver 1820 may determine a phase rotation value or per-antenna constellation mapping rules.

Next, the receiver 1820 transmits to the transmitter 1810 the information on the selected beams at step 1850 and then the information on the mapping rule at step 1855.

Then the transmitter 1810 may allocate N beams at step 1860 and apply the mapping rule at step 1865 to transmit data to the receiver 1820 at step 1870.

Figure 19:
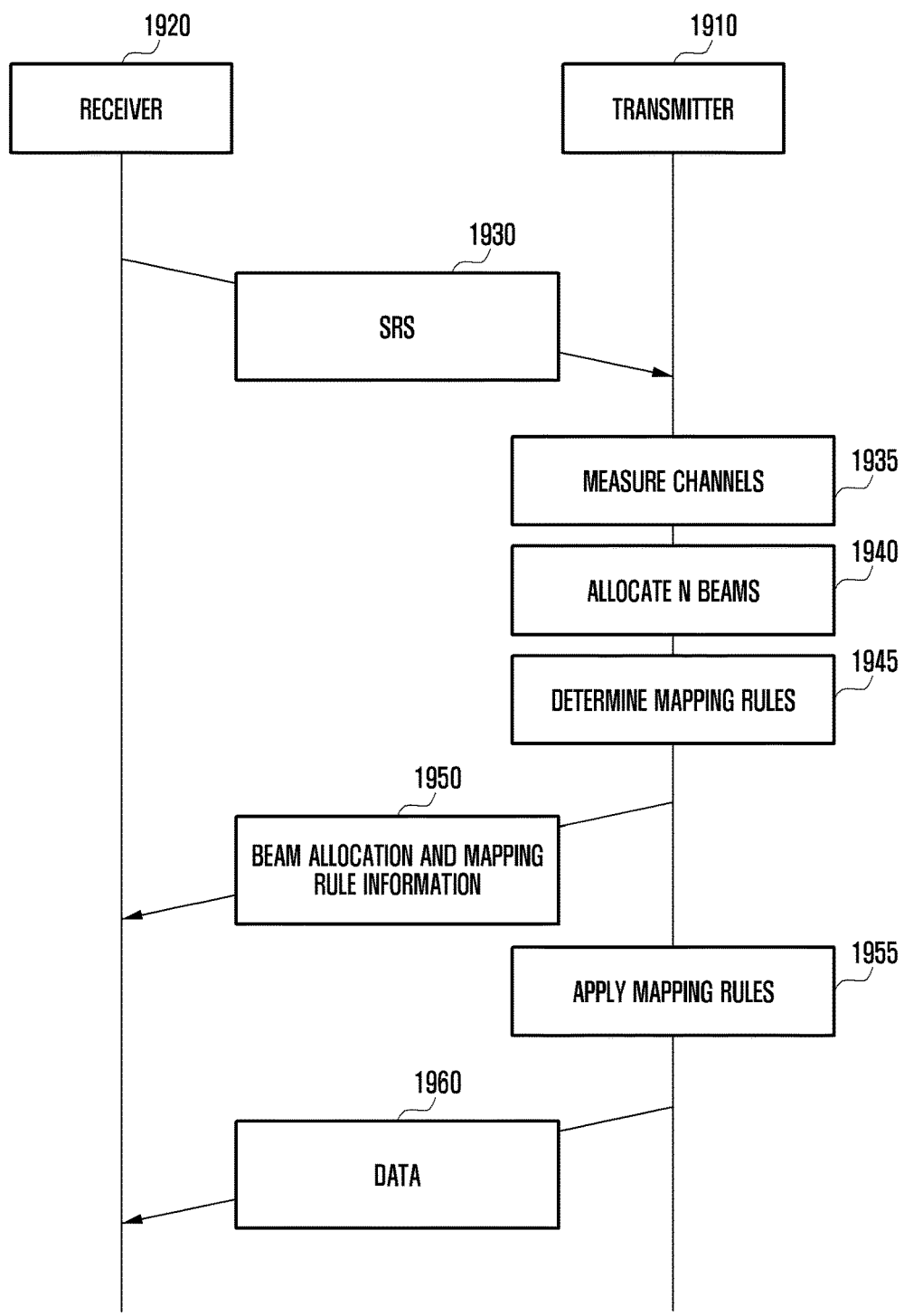
FIG. 19 is a signal flow diagram illustrating signal flows between a transmitter and a receiver according to still another embodiment of the present invention.

FIG. 19 is a signal flow diagram illustrating signal flows between a transmitter and a receiver according to still another embodiment of the present invention.

In reference to FIG. 19, the transmitter 1910 may perform channel estimation based on a reference signal transmitted by the receiver 1920 and determine transmission beams and beam mapping rules based on the estimated channel information. According to an embodiment, this method may be applicable to a TDD system.

In detail, the receiver 1920 may transmit channel measurement configuration information at step 1930. The channel measurement configuration information may include a Sounding Reference Signal (SRS).

Next, the transmitter 1910 may perform channel measurement at step 1935, allocate N beams based on the channel measurement result at step 1940, and determine mapping rules according to one of the above-described embodiments at step 1945. For example, the transmitter 1920 may determine a phase rotation value or per-antenna constellation mapping rules.

Next, the transmitter 1910 may transmit to the receiver 1920 the information on the beam allocation and mapping rules at step 1950 and apply the mapping rules at step 1955 to transmit data to the receiver 1920 at step 1960.

Figure 20:
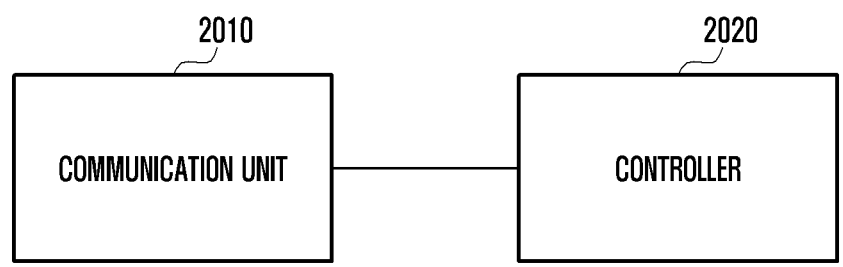
FIG. 20 is a block diagram illustrating a configuration of an eNB according to an embodiment of the present invention.

FIG. 20 is a block diagram illustrating a configuration of an eNB according to an embodiment of the present invention.

In reference to FIG. 20, the eNB includes a communication unit 2010 and a controller 2020 for controlling overall operations of the eNB.

The controller 2020 of the eNB may control the eNB to perform the operations of one of the above-described embodiments. For example, the controller 2020 may control the eNB to transmit channel measurement configuration information to a UE, receive channel information from the UE, and transmit a first symbol through at least two antennas and a second symbol as phase-rotated to different degrees through at least two antennas.

The communication unit 2010 may transmit and receive signals according to one of the above-described embodiments.

Figure 21:
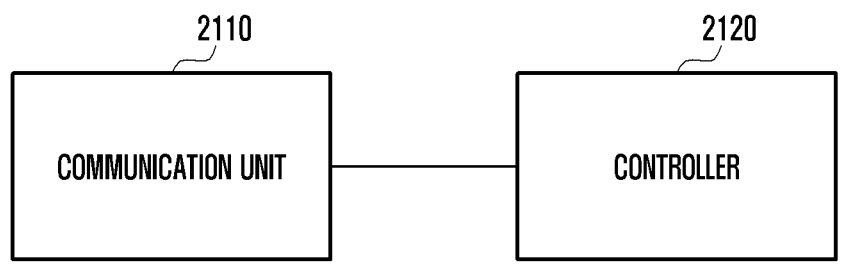
FIG. 21 is a block diagram illustrating a configuration of a UE according to an embodiment of the present invention.

FIG. 21 is a block diagram illustrating a configuration of a UE according to an embodiment of the present invention.

In reference to FIG. 21, the UE may include a communication unit 2110 and a controller 2120 for controlling overall operations of the UE.

The controller 2120 of the UE controls the UE to perform the operations of one of the above-described embodiments. For example, the controller 2120 may control the UE to receive channel measurement configuration information from an eNB, perform channel measurement, transmit channel information to the eNB, and receive a first symbol through at least two antennas and a second symbol phase-rotated to different degrees through at least two antennas.

The communication unit 2110 may transmit and receive signals according to one of the above-described embodiments.

Although the above-described embodiments are directed to the exemplary cases where an eNB transmits signals to a UE, it is obvious that the present invention is equally applicable to opposite cases, i.e., a case where a UE transmits signals to an eNB.

Although the above-described embodiments are directed to the exemplary cases where beams are formed over the LoS and NLoS links for convenience of explanation, the present invention is not limited to the beamforming over the LoS and NLoS links. That is, the present invention is applicable to all cases where the channel gains of two antennas are different from each other.

Although the above-described embodiments are directed to the cases where a transmitter uses two transmit antennas, the present invention is not limited to those cases. That is, the present invention is applicable to all situations where a transmitter use $N_{Tx}$ antennas.

In the above described embodiments of the present invention, the steps and message transmissions may become the targets of being selectively carried out or omitted. In each embodiment of the present invention, it is not necessary for the operations to be performed in the sequential order as depicted, and they may be performed in a changed order. Each step and message may be performed independently.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

Accordingly, it should be understood that the above-described embodiments are essentially for illustrative purpose only and are not in any way for restriction thereto. The scope of the present invention is to be determined by a reasonable interpretation of the appended claims and include all the changes within the equivalent range of the present invention.

The invention claimed is:

1. A method of a base station, the method comprising:
    transmitting channel measurement configuration information to a terminal;
    receiving channel information from the terminal;
    generating a first symbol and a second symbol for the terminal;
    transmitting, to the terminal, a first signal through a first antenna, the first signal comprising the first symbol and the second symbol, wherein a first mapping parameter is applied to the second symbol; and
    transmitting, to the terminal, a second signal through a second antenna, the second signal comprising the first symbol and the second symbol, wherein a second mapping parameter different from the first mapping parameter is applied to the second symbol,
    wherein the first symbol and the second symbol are transmitted through the first antenna and the second antenna based on one of following Equation 1, Equation 2 or Equation 3:
    wherein the Equation 1 recites $$\begin{bmatrix} x_1 \\ x_2 \end{bmatrix} = \frac{1}{\sqrt{2}} \begin{bmatrix} s_1 + e^{j\theta_1} s_2 \\ s_1 - s_2 \end{bmatrix},$$

wherein the Equation 2 recites $$\begin{bmatrix} x_1 \\ x_2 \end{bmatrix} = \frac{1}{\sqrt{2}} \begin{bmatrix} s_1 + e^{j\theta_1} s_2 \\ s_1 + e^{j\theta_2} s_2 \end{bmatrix},$$

and
wherein the Equation 3 recites $$\begin{bmatrix} x_1 \\ x_2 \end{bmatrix} = \frac{1}{\sqrt{2}} \begin{bmatrix} s_1 + a_1 s_2 \\ s_1 - a_2 s_2 \end{bmatrix},$$

where the $x_1$ denotes the first signal transmitted through the first antenna, the $x_2$ denotes the second signal transmitted through the second antenna, the $s_1$ and $s_2$ denote the first symbol and the second symbol, the $\theta_1$ denotes a phase rotation to be applied to the second symbol for transmission through the first antenna, the $\theta_2$ denotes a phase rotation to be applied to the second symbol for transmission through the second antenna, the $a_1$ denotes the first mapping parameter to be applied to the second symbol transmitted through the first antenna, and the $a_2$ denotes the second mapping parameter to be applied to the second symbol transmitted through the second antenna.

2. The method of claim 1, wherein receiving the channel information further comprises receiving information on at least one of the first mapping parameter or the second mapping parameter.

3. The method of claim 1, further comprising:
    determining the first mapping parameter and the second mapping parameter based on the channel information; and
    transmitting information on the first mapping parameter and the second mapping parameter to the terminal.

4. A method of a terminal, the method comprising:
    receiving channel measurement configuration information from a base station;
    measuring channels;
    transmitting channel information to the base station;
    receiving, from the base station, a first signal through a first antenna, the first signal comprising a first symbol and a second symbol, wherein a first mapping parameter is applied to the second symbol; and
    receiving, from the base station, a second signal through a second antenna, the second signal comprising the first symbol and the second symbol, wherein a second mapping parameter different from the first mapping parameter is applied to the second symbol,
    wherein the first symbol and the second symbol are transmitted through the first antenna and the second antenna based on one of following Equation 1, Equation 2 or Equation 3:
    wherein the Equation 1 recites $$\begin{bmatrix} x_1 \\ x_2 \end{bmatrix} = \frac{1}{\sqrt{2}} \begin{bmatrix} s_1 + e^{j\theta_1} s_2 \\ s_1 - s_2 \end{bmatrix},$$

wherein the Equation 2 recites $$\begin{bmatrix} x_1 \\ x_2 \end{bmatrix} = \frac{1}{\sqrt{2}} \begin{bmatrix} s_1 + e^{j\theta_1} s_2 \\ s_1 + e^{j\theta_2} s_2 \end{bmatrix},$$

and
wherein the Equation 3 recites $$\begin{bmatrix} x_1 \\ x_2 \end{bmatrix} = \frac{1}{\sqrt{2}} \begin{bmatrix} s_1 + a_1 s_2 \\ s_1 - a_2 s_2 \end{bmatrix},$$

where the $x_1$ denotes the first signal transmitted through the first antenna, $x_2$ denotes the second signal transmitted through the second antenna, the $s_1$ and $s_2$ denote the first symbol and the second symbol, $\theta_1$ denotes a phase rotation to be applied to the second symbol for transmission through the first antenna, $\theta_2$ denotes a phase rotation to be applied to the second symbol for transmission through the second antenna, $a_1$ denotes the first mapping parameter to be applied to the second symbol transmitted through the first antenna, and $a_2$ denotes the second mapping parameter to be applied to the second symbol transmitted through the second antenna.

5. The method of claim 4, further comprising:
determining at least one of the first mapping parameter and the second mapping parameter, and
wherein at least one of the first mapping parameter and the second mapping parameter is included in the channel information.

6. The method of claim 4, further comprising receiving at least one of the first mapping parameter and the second mapping parameter from the base station.

7. A base station comprising:
a transceiver configured to transmit and receive signals; and
at least one processor configured to:
transmit channel measurement configuration information to a terminal,
receive channel information from the terminal,
generate a first symbol and a second symbol for the terminal,
transmit, to the terminal, a first signal through a first antenna, the first signal comprising the first symbol and the second symbol, wherein a first mapping parameter is applied to the second symbol, and
transmit, to the terminal, a second signal through a second antenna, the second signal comprising the first symbol and the second symbol, wherein a second mapping parameter different from the first mapping parameter is applied to the second symbol,
wherein the first symbol and the second symbol are transmitted through the first antenna and the second antenna based on one of following Equation 1, Equation 2 or Equation 3:
wherein the Equation 1 recites $$\begin{bmatrix} x_1 \\ x_2 \end{bmatrix} = \frac{1}{\sqrt{2}} \begin{bmatrix} s_1 + e^{j\theta_1} s_2 \\ s_1 - s_2 \end{bmatrix},$$

wherein the Equation 2 recites $$\begin{bmatrix} x_1 \\ x_2 \end{bmatrix} = \frac{1}{\sqrt{2}} \begin{bmatrix} s_1 + e^{j\theta_1} s_2 \\ s_1 + e^{j\theta_2} s_2 \end{bmatrix},$$

and
wherein the Equation 3 recites $$\begin{bmatrix} x_1 \\ x_2 \end{bmatrix} = \frac{1}{\sqrt{2}} \begin{bmatrix} s_1 + a_1 s_2 \\ s_1 - a_2 s_2 \end{bmatrix},$$

where the $x_1$ denotes the first signal transmitted through the first antenna, the $x_2$ denotes the second signal transmitted through the second antenna, the $s_1$ and $s_2$ denote the first symbol and the second symbol, the $\theta_1$ denotes a phase rotation to be applied to the second symbol for transmission through the first antenna, the $\theta_2$ denotes a phase rotation to be applied to the second symbol for transmission through the second antenna, the $a_1$ denotes the first mapping parameter to be applied to the second symbol transmitted through the first antenna, and the $a_2$ denotes the second mapping parameter to be applied to the second symbol transmitted through the second antenna.

8. The base station of claim 7, wherein the at least one processor is further configured to receive information on at least one of the first mapping parameter and the second mapping parameter.

9. The base station of claim 7, wherein the at least one processor is further configured to:
determine the first mapping parameter and the second mapping parameter based on the channel information, and
transmit information on the first mapping parameter and the second mapping parameter.

10. A terminal comprising:
a transceiver configured to transmit and receive signals; and
at least one processor configured to:
receive channel measurement configuration information from a base station,
measure channels,
transmit channel information to the base station,
receive, from the base station, a first signal through a first antenna, the first signal comprising a first symbol and a second symbol, wherein a first mapping parameter is applied to the second symbol, and
receive, from the base station, a second signal through a second antenna, the second signal comprising the first symbol and the second symbol, wherein a second mapping parameter different from the first mapping parameter is applied to the second symbol,
wherein the first symbol and the second symbol are transmitted through the first antenna and the second antenna based on one of following Equation 1, Equation 2 or Equation 3:
wherein the Equation 1 recites $$\begin{bmatrix} x_1 \\ x_2 \end{bmatrix} = \frac{1}{\sqrt{2}} \begin{bmatrix} s_1 + e^{j\theta_1} s_2 \\ s_1 - s_2 \end{bmatrix},$$

wherein the Equation 2 recites $$\begin{bmatrix} x_1 \\ x_2 \end{bmatrix} = \frac{1}{\sqrt{2}} \begin{bmatrix} s_1 + e^{j\theta_1} s_2 \\ s_1 + e^{j\theta_2} s_2 \end{bmatrix},$$

and
wherein the Equation 3 recites $$\begin{bmatrix} x_1 \\ x_2 \end{bmatrix} = \frac{1}{\sqrt{2}} \begin{bmatrix} s_1 + a_1 s_2 \\ s_1 - a_2 s_2 \end{bmatrix},$$

where the $x_1$ denotes the first signal transmitted through the first antenna, the $x_2$ denotes the second signal transmitted through the second antenna, the $s_1$ and $s_2$ denote the first symbol and the second symbol, the $\theta_1$ denotes a phase rotation to be applied to the second symbol for transmission through the first antenna, the $\theta_2$ denotes a phase rotation to be applied to the second symbol for transmission through the second antenna, the $a_1$ denotes the first mapping parameter to be applied to the second symbol transmitted through the first antenna, and the $a_2$ denotes the second mapping parameter to be applied to the second symbol transmitted through the second antenna.

11. The terminal of claim 10, wherein the at least one processor is further configured to determine at least one of the first mapping parameter and the second mapping parameter,
wherein at least one of the first mapping parameter and the second mapping parameter is included in the channel information.

12. The terminal of claim 10, wherein the at least one processor is further configured to receive at least one of the first mapping parameter and the second mapping parameter from the base station.

13. The method of claim 1, wherein the first mapping parameter is different from the second mapping parameter.

14. The method of claim 4, wherein the first mapping parameter is different from the second mapping parameter.

* * * * *